(12) United States Patent
Leiponis et al.

(10) Patent No.: US 10,089,501 B2
(45) Date of Patent: Oct. 2, 2018

(54) MULTI-MEDIA READER APPARATUS, SECURE TRANSACTION SYSTEM AND METHODS THEREOF

(71) Applicant: Parabit Systems, Inc., Roosevelt, NY (US)

(72) Inventors: Robert J. Leiponis, Glen Cove, NY (US); Joseph P. Randolph, Winchester, MA (US); David Conroy, Brooklyn, NY (US); Catalin Moisanu, Centerport, NY (US)

(73) Assignee: Parabit Systems, Inc., Roosevelt, NY (US)

( * ) Notice: Subject to any disclaimer, the term of this patent is extended or adjusted under 35 U.S.C. 154(b) by 0 days.

(21) Appl. No.: 15/456,470

(22) Filed: Mar. 10, 2017

(65) Prior Publication Data
US 2017/0262664 A1    Sep. 14, 2017

Related U.S. Application Data

(60) Provisional application No. 62/306,808, filed on Mar. 11, 2016.

(51) Int. Cl.
*G06K 7/00* (2006.01)
*G06K 7/10* (2006.01)
*G07F 19/00* (2006.01)

(52) U.S. Cl.
CPC ......... *G06K 7/0004* (2013.01); *G06K 7/0078* (2013.01); *G06K 7/10128* (2013.01); *G06K 7/10316* (2013.01); *G07F 19/20* (2013.01)

(58) Field of Classification Search
CPC ........... G06K 7/00; G06K 19/00; G06F 17/00

USPC ................. 235/440, 375, 439, 487
See application file for complete search history.

(56) References Cited

U.S. PATENT DOCUMENTS

| | | | |
|---|---|---|---|
| 6,460,771 B1 | 10/2002 | May | |
| 6,766,943 B2 | 7/2004 | Magee et al. | |
| 7,075,429 B2 | 7/2006 | Marshall | |
| 7,143,934 B2 | 12/2006 | Ghisani | |
| 7,500,609 B2 | 3/2009 | Hirasawa et al. | |

(Continued)

FOREIGN PATENT DOCUMENTS

| CN | 101561953 | 10/2009 |
|---|---|---|
| WO | 2006008559 | 1/2006 |

(Continued)

OTHER PUBLICATIONS

International Search Report for PCT/US2017/021977; dated Jul. 19, 2017; 17 pages.

(Continued)

*Primary Examiner* — Edwyn Labaze
(74) *Attorney, Agent, or Firm* — Gerald E. Hespos; Michael J. Porco; Matthew T. Hespos

(57) ABSTRACT

A multi-media reader (MMR) apparatus, secure transaction system and methods thereof are provided. The MMR apparatus includes a slot to receive a card and a near field communication (NFC) antenna to communicate with other NFC enabled devices and cards. The system is provided for securely sharing information over a network to complete one or more transactions using the MMR apparatus and a mobile device. The shared information may be separated and reassembled using on or more servers to increase security.

30 Claims, 27 Drawing Sheets

(56) References Cited

U.S. PATENT DOCUMENTS

| | | |
|---|---|---|
| 7,597,250 B2 | 10/2009 | Finn |
| 7,606,560 B2 | 10/2009 | Labrou et al. |
| 7,992,776 B1 | 8/2011 | Ramachandran et al. |
| 8,217,793 B2 | 7/2012 | Broer |
| 8,326,759 B2 | 12/2012 | Hammad |
| 8,348,162 B2 | 1/2013 | Xiao |
| 8,523,072 B2 | 9/2013 | Randolph |
| 8,554,689 B2 | 10/2013 | Mardikar et al. |
| 8,632,000 B2 | 1/2014 | Laracey |
| 8,757,488 B2 | 6/2014 | Randolph |
| 8,799,085 B2 | 8/2014 | Fisher |
| 8,818,867 B2 | 8/2014 | Baldwin et al. |
| 8,875,994 B2 | 11/2014 | Theobald |
| 8,978,868 B2 | 3/2015 | Johnson et al. |
| 9,589,427 B1 | 3/2017 | Ohlsson |
| 9,699,406 B1 | 7/2017 | Pranger et al. |
| 2005/0155068 A1 | 7/2005 | Chang |
| 2006/0069916 A1 | 3/2006 | Jenisch et al. |
| 2007/0040023 A1 | 2/2007 | Ruggirello et al. |
| 2007/0162604 A1* | 7/2007 | Murakami ............ G06Q 40/00 709/226 |
| 2007/0203850 A1 | 8/2007 | Singh et al. |
| 2008/0077527 A1 | 3/2008 | Choe et al. |
| 2009/0214038 A1 | 8/2009 | Wong et al. |
| 2009/0288012 A1 | 11/2009 | Hertel et al. |
| 2010/0028160 A1 | 2/2010 | Schaeffer et al. |
| 2010/0099356 A1* | 4/2010 | Forrest ................ H04B 5/02 455/41.2 |
| 2010/0223145 A1 | 9/2010 | Dragt |
| 2010/0274721 A1 | 10/2010 | Hammad |
| 2011/0078031 A1 | 3/2011 | Mardikar et al. |
| 2011/0238573 A1 | 9/2011 | Varadarajan |
| 2012/0009873 A1 | 1/2012 | Corda et al. |
| 2012/0265679 A1 | 10/2012 | Calman et al. |
| 2012/0265809 A1* | 10/2012 | Hanson ................ H04L 67/141 709/204 |
| 2013/0091059 A1 | 4/2013 | Stals et al. |
| 2013/0268378 A1 | 10/2013 | Yovin |
| 2014/0158768 A1 | 6/2014 | Ray et al. |
| 2014/0187147 A1 | 7/2014 | Rochberger et al. |
| 2014/0197235 A1 | 7/2014 | Shisgal |
| 2015/0278781 A1* | 10/2015 | Ewing ................ G06Q 20/108 705/42 |
| 2015/0348013 A1 | 12/2015 | Gulchenko |
| 2016/0005038 A1 | 1/2016 | Kamal et al. |

FOREIGN PATENT DOCUMENTS

| | | |
|---|---|---|
| WO | 2007026212 | 3/2007 |
| WO | 2008050132 | 5/2008 |

OTHER PUBLICATIONS

Crowe et al.; "Is Payment Tokenization Ready for Primetime?"; Federal Reserve Bank of Boston; dated Jun. 11, 2015; 51 pages.

English Machine Translation of CN101561953 obtained from Espacenet of the European Patent Office on Mar. 21, 2017, 25 total pages including abstract, description and claims.

International Preliminary Report on Patentability for PCT/US2017/021977; dated Feb. 23, 2018; 4 pages.

* cited by examiner

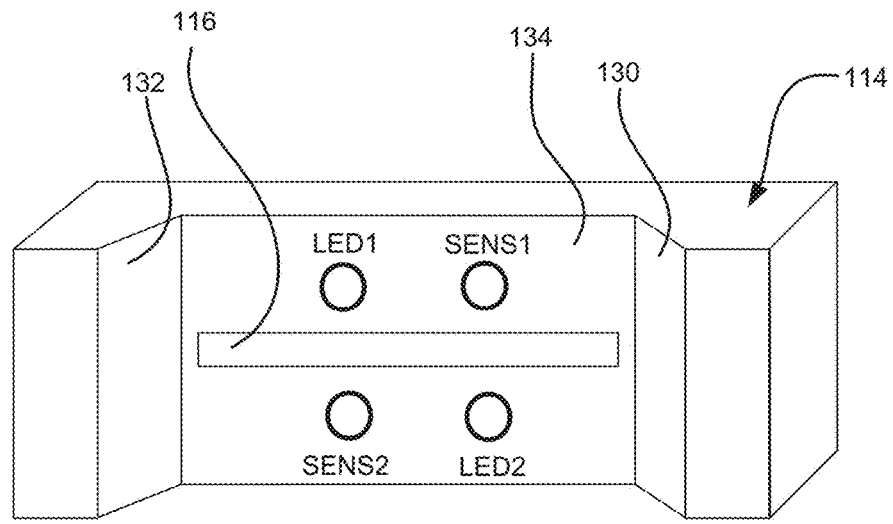
FIG. 4A
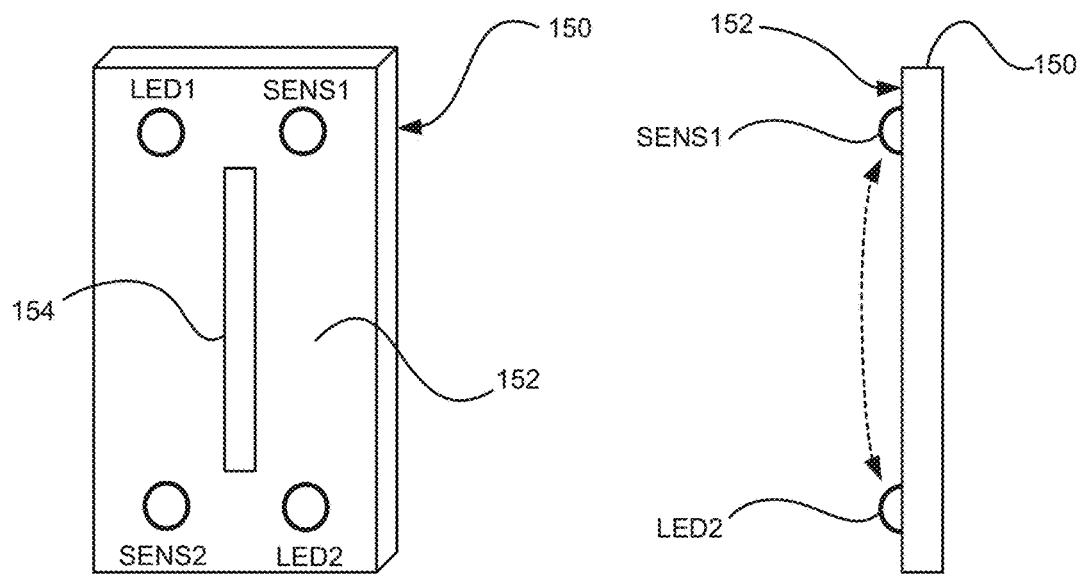
FIG. 4B
FIG. 4C

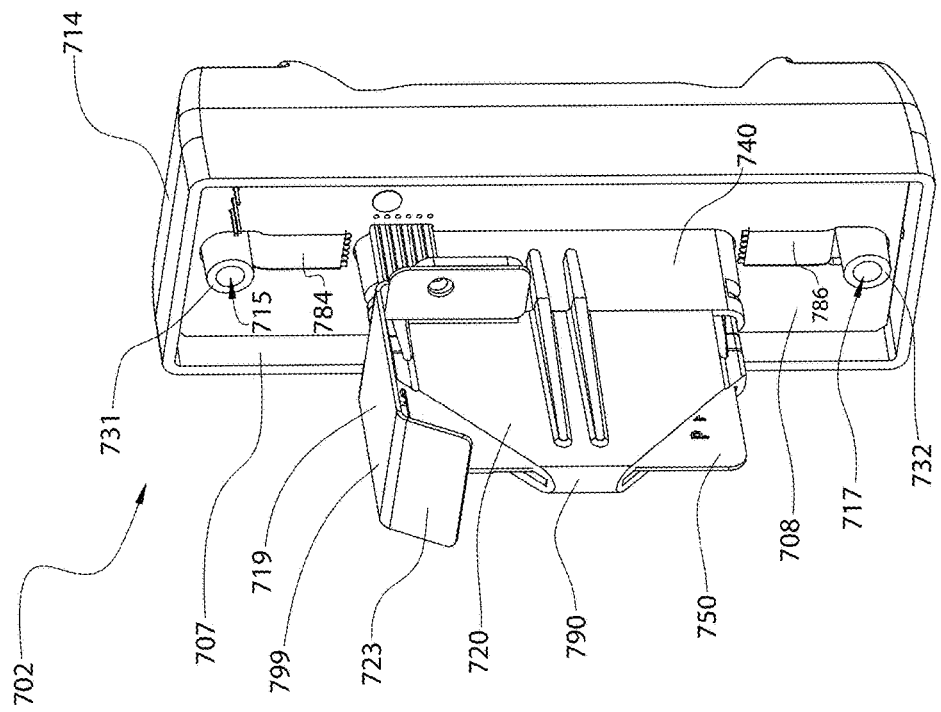
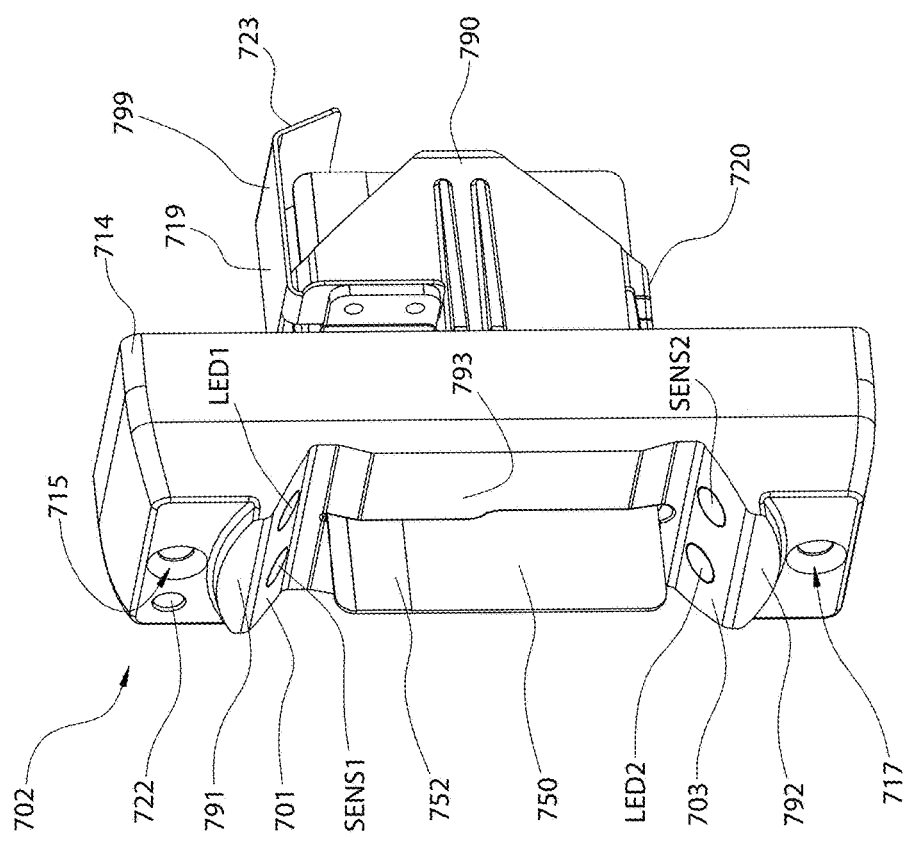
FIG. 7B
FIG. 7A

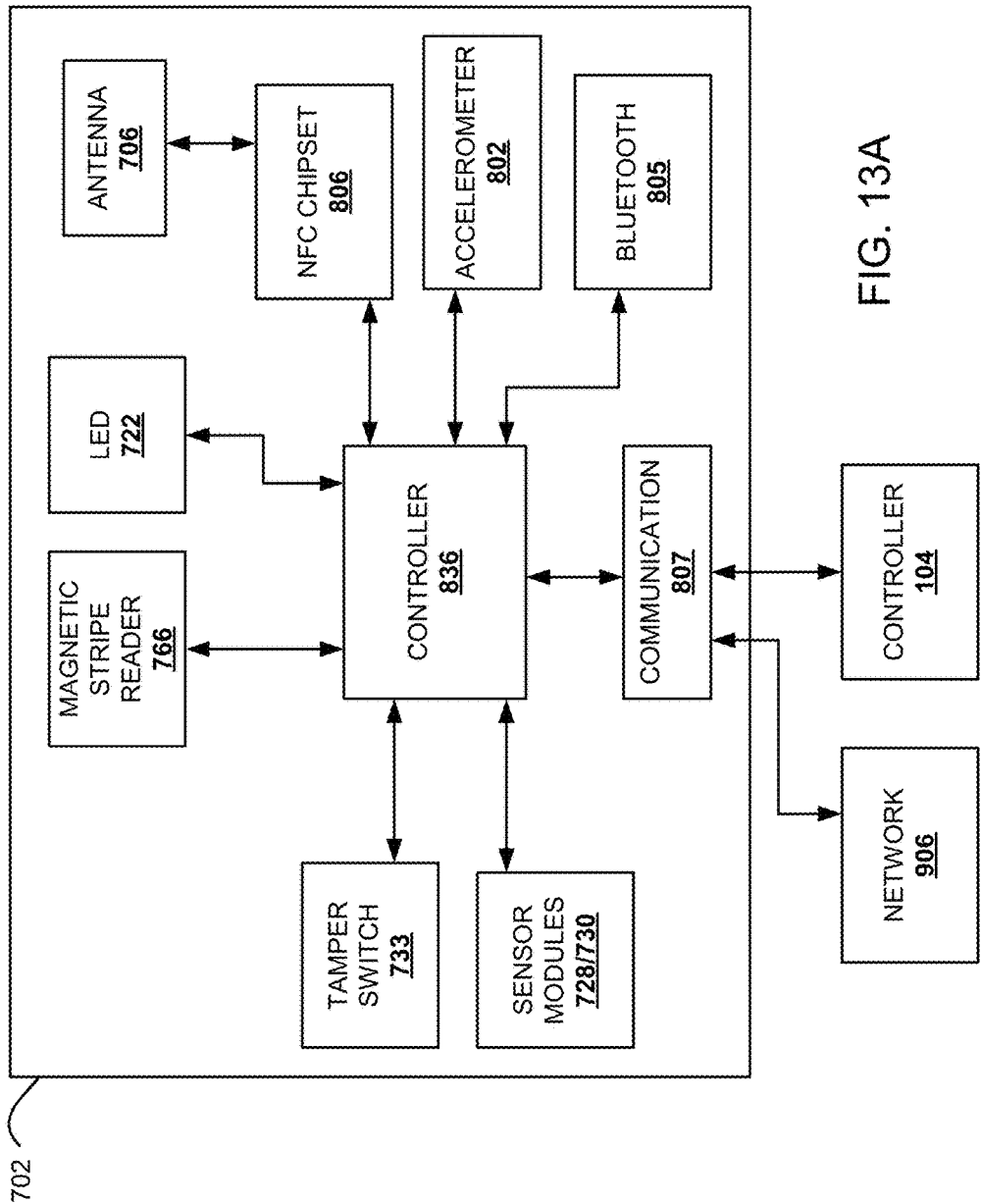

MULTI-MEDIA READER APPARATUS, SECURE TRANSACTION SYSTEM AND METHODS THEREOF

PRIORITY

This application claims priority to U.S. Provisional Patent Application No. 62/306,808, filed Mar. 11, 2016, entitled "MULTI-MEDIA READER APPARATUS, METHOD, AND SYSTEM", the contents of which are hereby incorporated by reference in its entirety.

BACKGROUND

Field

The present disclosure relates generally to multi-media reader protection systems, and more particularly, to devices, systems and methods for detecting skimming devices and securely processing transactions.

Description of the Related Art

Card readers are data input devices employed to read data from a card-shaped storage medium such as a plastic card with a magnetic stripe. Card readers may be employed, for example, as access control devices and at self-service terminals, for example, automated teller machines (ATMs), gas pumps, retail credit/debit card terminals, parking facilities, etc.

Conventional self-service terminals are frequently encountered functioning as an automated teller machine (ATM) or account statement printer. In order to operate said terminal, the user, or customer, requires a bank card that usually takes the form of a magnetic stripe card or a contactless EMV card or an NFC enabled mobile or wearable device, which is read by a card reader, on which card data including personal customer and account data are stored. Unfortunately, manipulation at self-service terminals is being practiced to an increasing degree by third parties in order to illegally acquire these data.

To do this, third parties employ their own card reader, known as a skimming device, which are installed as unobtrusively as possible at the particular self-service terminal's card reader. The skimming device is positioned as directly as possible in front of the authentic card slot for the self-service terminal, replaces the actual card reader or places a card reader next to the existing card reader. When a customer inserts their bank card into the card reader or waves their card or mobile/wearable device over the card reader of the self-service terminal, its magnetic stripe, EMV chipset or NFC enabled chipset is also read by this illicit external card reader, whereby the third party acquires the card/mobile device data, in particular the customer's account data or device ID data, making it possible for the third party to produce an illegal copy of the bank card or mobile/wearable device. If the third party is additionally successful in spying out the PIN associated with the card or mobile/wearable device, they can easily withdraw money from the bank customer's account at automated teller machines (ATMs) using a counterfeit bank card/mobile device and the PIN. In order to obtain the PIN information, it is possible, for example, to install a counterfeit keypad over the genuine keypad in order to acquire the keystrokes that have been made or to install a micro video camera that captures images of the customer entering a PIN via the original keypad.

Therefore, a need exists for devices, systems and methods for detecting the invasion of skimming devices used in conjunction with a card reader.

SUMMARY

A multi-media reader apparatus and a secure transaction system are provided.

According to one aspect of the present disclosure, a multimedia reader (MMR) assembly is provided including: a housing having a first slot disposed through a surface of the housing, the slot configured to receive a card in a direction of entry into the first slot and into an interior of the housing; a near field communication (NFC) antenna disposed in the interior of the housing and configured to send and receive NFC signals; and at least one light sensor and at least one light emitter, the at least one light sensor and at least one light emitter configured to detect an object placed over the slot.

In another aspect, the MMR assembly is provided wherein the NFC antenna includes a surface and a second slot disposed through the surface, the NFC antenna disposed in the interior of the housing such that the surface of the NFC antenna is aligned with the surface of the housing and the first slot is aligned with the second slot to receive the card in the direction of entry.

In another aspect, the MMR assembly is provided further comprising a bracket coupled to the housing, the bracket configured to mount the MMR assembly to an external surface, the bracket including a tamper switch configured to detect if the MMR assembly has been displaced from the external surface.

In another aspect, the MMR assembly is provided further comprising an accelerometer that is configured to detect if the MMR assembly has been moved.

In another aspect, the MMR assembly is provided further comprising a Bluetooth chipset configured to detect and communicate with other devices including Bluetooth capabilities that are located proximately to the MMR assembly.

In another aspect, the MMR assembly is provided wherein the Bluetooth chipset is configured to detect at least one mobile device including Bluetooth capabilities and located proximately to the MMR assembly, and wherein the Bluetooth chipset is configured to send at least one communication signal to the at least one mobile device to cause a mobile application on the mobile device to be auto launched, the mobile application associated with the MMR assembly.

In another aspect, the MMR assembly is provided further comprising a communication module coupled to a network, the communication module configured to receive a communication from a mobile device, the communication associated with a transaction.

In another aspect, the MMR assembly is provided wherein the communication module is further configured to separate the communication into a plurality of communications, and send each of the plurality of communications to a separate server via the network.

In another aspect, the MMR assembly is provided wherein the MMR assembly is coupled to at least one transaction terminal and the communication module is configured to initiate a communication session between the MMR assembly, the mobile device, and the transaction terminal to complete the transaction.

In another aspect, the MMR assembly is provided wherein the communication module is configured to transfer the transaction from the transaction terminal to the mobile device.

In another aspect of the present disclosure, a system is provided including: at least one multimedia reader (MMR) assembly configured to receive a user credential, the MMR further configured to provide the user credential to a communication module; the communication module configured to receive the user credential and separate the user credential into a plurality of communications, each of the plurality of communications including a separate portion of the user credential, the communication module further configured to provide each of the plurality of communications to a separate server of a plurality of servers; and each of the servers of the plurality of servers configured to receive a corresponding communication of the plurality of communications, wherein a first server of the plurality of servers is configured to request each communication of the plurality of communications from each of the other servers and reassemble the plurality of communications to obtain the user credential.

In another aspect, the system is provided wherein the communication module receives transaction data, separates the transaction data into a second plurality of communications, and provides the second plurality of communications to a separate server of the plurality of server.

In another aspect, the system is provided wherein the communication module is included in the MMR assembly.

In another aspect, the system is provided wherein the first server is configured to transmit the user credential to at least one of a merchant processor and a card issuer to complete a transaction.

In another aspect, the system is provided wherein the first server is a server of the plurality of servers that receives a communication of the plurality of communications earliest relative to each other server of the plurality of servers.

In another aspect, the system is provided wherein the MMR assembly further includes a near field communication (NFC) antenna configured to send and receive NFC signals, and the at least one credential is received by the NFC antenna of the MMR assembly.

In another aspect, the system is provided further comprising a transaction terminal coupled to the MMR assembly, wherein the user credential is used in association with a transaction involving the transaction terminal.

In another aspect, the system is provided wherein the communication module is included in the transaction terminal.

In another aspect, the system is provided further comprising a mobile device, wherein the mobile device and the transaction terminal each include an application configured to initiate a communication session between the MMR assembly, the mobile device, and the transaction terminal to complete the transaction.

In another aspect, the system is provided wherein the application included in the transaction terminal is configured to stream information associated with the transaction to the application included in the mobile device, the application included in the mobile device configured to display the streamed information associated with the transaction.

In another aspect, the system is provided further comprising a mobile device configured to send the user credential to the MMR assembly to complete a transaction, wherein at least one of the mobile device and the MMR assembly are used to obtain location identifying information associated with the transaction, the location identifying information used to authenticate the transaction.

In another aspect, the system is provided further comprising a mobile device including an application configured to send the user credential from the mobile device to the MMR assembly, wherein the MMR assembly is configured to detect the presence of the mobile device and cause the application to be auto launched on the mobile device upon detecting the presence of the mobile device.

In another aspect, the system is provided wherein each of the mobile device and the MMR assembly are configured with Bluetooth communication capabilities, and the Bluetooth communication capabilities of each are used to detect the presence of the mobile device and auto launch the application on the mobile device.

In another aspect, the system is provided further comprising a mobile device configured to provide the user credential to the MMR assembly, the user credential partially stored in a memory of the mobile device and partially stored in at least one remote server, wherein the mobile device is configured to request the part of the user credential stored in the at least one remote server to assemble the user credential and provide the user credential to the MMR assembly.

BRIEF DESCRIPTION OF THE DRAWINGS

The above and other aspects, features, and advantages of the present disclosure will become more apparent in light of the following detailed description when taken in conjunction with the accompanying drawings in which:

FIG. 4A is a view of a face plate of the anti-skimming device in accordance with another embodiment of the present disclosure;

FIG. 4B is a view of a face plate of the anti-skimming device in accordance with yet another embodiment of the present disclosure FIG. 4C is a side view of the face plate shown in FIG. 4B;

FIG. 7A is a front perspective view of multi-media reader (MMR) device in accordance with an embodiment of the present disclosure;

FIG. 7B is a rear perspective view of the MMR device of FIG. 7A in accordance with an embodiment of the present disclosure;

FIG. 13A is a block diagram of the MMR device of FIG. 7A in accordance with an embodiment of the present disclosure;

DETAILED DESCRIPTION

Figure 1:
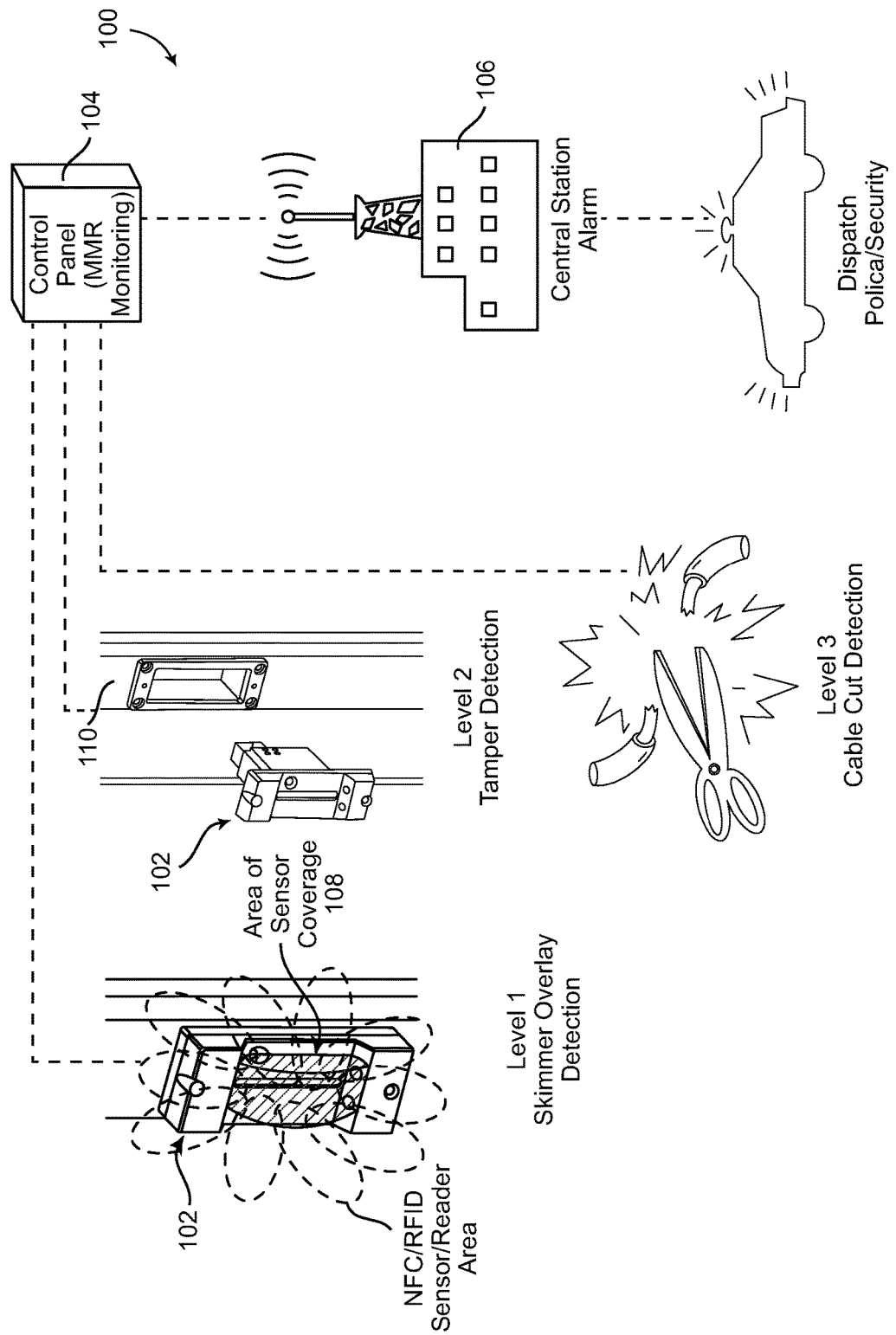
FIG. 1 is a diagram of a card reader protection system in accordance with an embodiment of the present disclosure.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The word "exemplary" is used herein to mean "serving as an example, instance, or illustration." Any configuration or design described herein as "exemplary" is not necessarily to be construed as preferred or advantageous over other configurations or designs. Herein, the phrase "coupled with" is defined to mean directly connected to or indirectly connected with through one or more intermediate components. Such intermediate components may include both hardware and software based components.

Referring to FIG. 1, a card reader protection system 100 in accordance with an embodiment of the present disclosure is illustrated. The card reader protection system 100 includes a card reader assembly 102 coupled to a control panel 104, which is in communication with an alarm monitoring central station 106. The card reader protection system 100 provides three levels of detection 1.) skimmer overlay detection; 2.) tamper detection; and 3.) cable cut detection. Initially, the card reader assembly 102 is configured to constantly monitor a defined area 108 in front of the card reader surface to detect if a skimming device was placed thereon. A faceplate of the card reader assembly 102 also provides raised sections which provide for a mechanically difficult area to install a skimming device. When an object is placed over a card slot of the card reader assembly 102 for a predetermined time interval, an input will be activated on the control panel 104. Secondly, the card reader assembly 102 provides a tamper detection indication to the control panel 104 immediately upon the removal of the card reader assembly 102 from its installed location 110, for example, a door frame of an access entrance. Thirdly, the card reader protection system 100 constantly monitors continuity of a cable or wires between the card reader assembly 102 and the control panel 104. Once any of the cables or wires between the card reader assembly 102 and the control panel 104 are cut, an input is activated on the control panel 104.

It is to be appreciated that any one of the above described conditions will trigger an alarm at the control panel 104. In one embodiment, an alarm trigger will cause the alarm to be transmitted to, for example, a central station which will notify or dispatch the proper party. In another embodiment, alarm trigger may be employed to activate a video recorder at the site in an attempt to capture an image of a person attempting to manipulate the system. In a further embodiment, an alarm trigger may be employed to disable a corresponding system, e.g., an ATM, an access control system, etc. It is appreciated that these examples are not exhaustive and other example and scenarios are contemplated by the teachings of the present disclosure.

Although the teachings of the present disclosure are described in relation to a card reader assembly employed with an access control system, the card reader assembly may be employed in various systems and apparatus such as an automated teller machine (ATM), a self-service gas pump, a parking system, etc. It is to be appreciated that this list is not exhaustive but merely exemplary environments and the teachings of the present disclosure may be applied to any currently known or to be developed systems that employ mechanisms for reading card-shaped storage mediums, e.g., a bank card. Furthermore, the type of card-shaped storage medium is not critical to the teachings of the present disclosure and may be of various known or to be developed card-shaped storage mediums such as a card with a magnetic stripe or a chip-based card. Additionally, the card-shaped storage medium may take many physical forms, and therefore, its material (e.g., plastic, paper, etc.), thickness, length and width is not critical to the teachings of the present disclosure.

Figure 2:
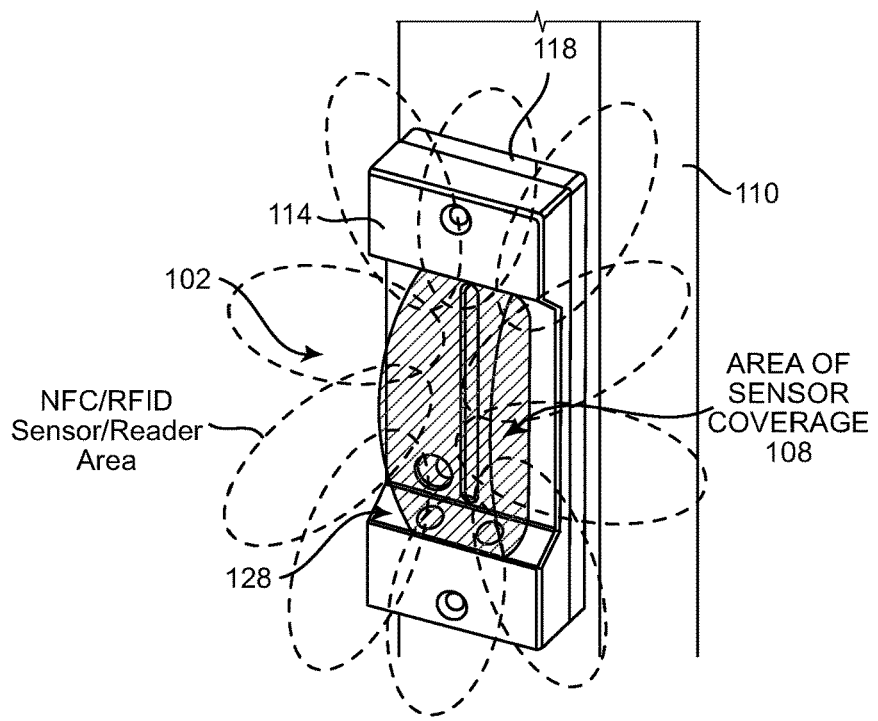
FIG. 2 is a diagram of an anti-skimming device in accordance with an embodiment of the present disclosure.
Figure 3:
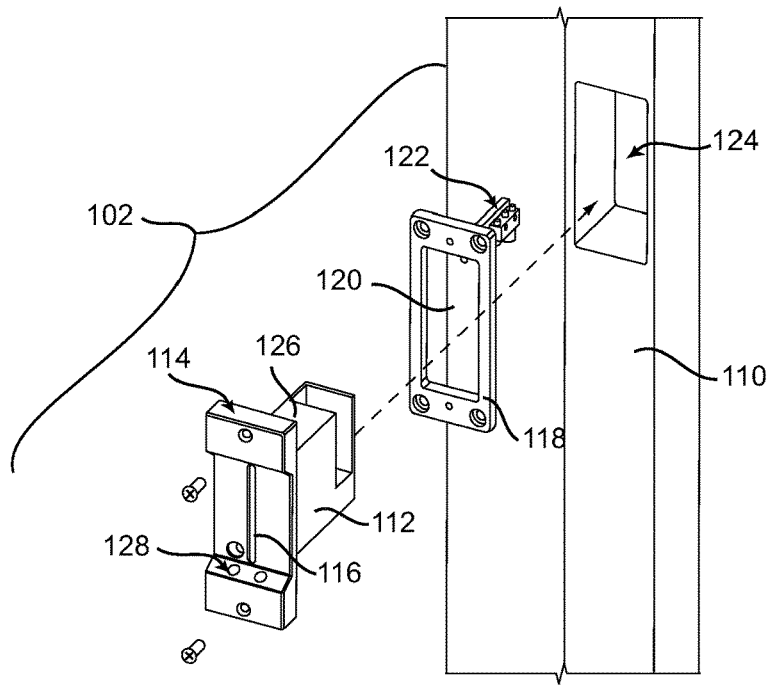
FIG. 3 is an exploded view of the anti-skimming device shown in FIG. 2.

Referring to FIGS. 2 and 3, the card reader assembly 102 is shown in greater detail mounted to a predetermined location 110, e.g., a door frame, and in an exploded view. The card reader assembly 102 includes a housing 112 and a face plate 114 for defining a card slot 116 for receiving a card of a user, e.g., an access card, bank card or the like. The housing 112 is configured to house a card reader or sensor for reading data or information from the card-shaped storage medium, e.g., a magnetic stripe on a plastic or paper bank card. It is to be appreciated that the card reader or sensor will be matched to the type of the card-shaped storage medium employed in a particular embodiment, for example, a card having a magnetic stripe, a chip-based card, etc.

The card reader assembly 102 further includes a collar 118 for securing the housing 112 and face plate 114 to the mounting location 110. The collar 118 is generally rectangular and is configured with an opening 120 to accommodate the housing 112. The collar 118 further includes a contact switch 122 that monitors the removal of the housing 112 when installed at the mounting location 110. Generally, the mounting location 110 includes a cutout 124 to receive at least the housing 112. In the embodiment shown in FIG. 3, the cutout 124 is a generally rectangular aperture on which the collar 118 is mounted. The opening 120 of the collar 118 is configured to coincide with the aperture of the cutout 124. When the collar 118 is mounted on location 110, the contact switch 122 is disposed in the cutout 124 and is configured to make contact with a surface 126 of the housing 112 when the housing 112 is disposed in the cutout 124. Any movement of the housing 112 greater than a predetermined distance, e.g., 1/16 of an inch, activates an input on the control panel 104.

The face plate 114 includes an array of infrared proximity detectors 128, e.g., two sets of infrared emitters and receivers, that constantly monitor an area 108 in front of a surface of the face plate 114. Any object, e.g., a skimming device, placed on the face plate 114, or partially covering the card reader slot 116 will be detected and trigger an alarm to the control panel 104. It is to be appreciated that infrared emitters and receivers are exemplary and other types of light emitters and receivers are contemplated to be within the scope of the present disclosure.

Figure 4:
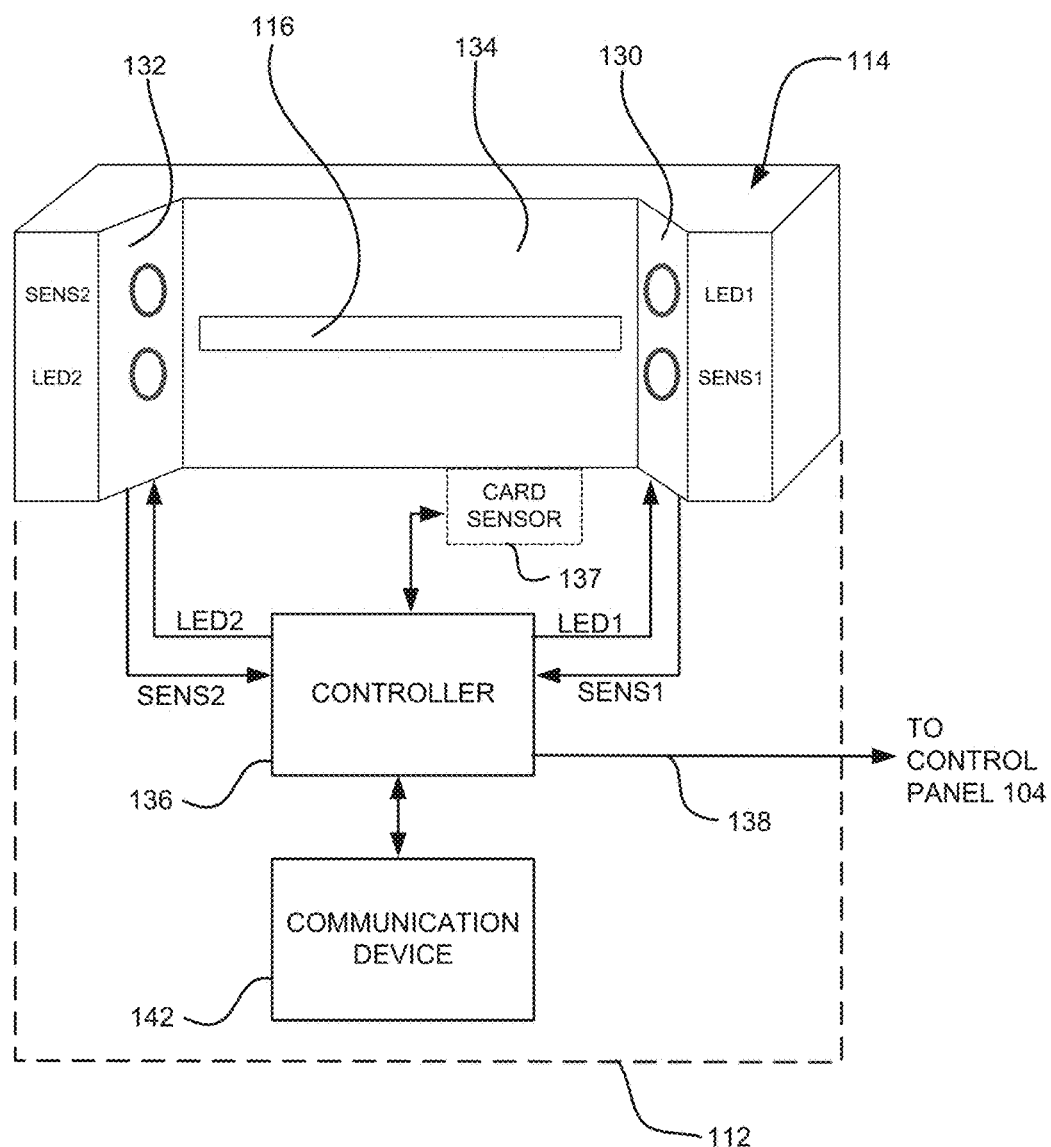
FIG. 4 is a view of a face plate of the anti-skimming device in accordance with an embodiment of the present disclosure.

The skimming device detection feature will be described with reference to FIG. 4. In this embodiment, the face plate 114 of the card reader contains two sensors (SENS1 and SENS2) and two infra-red LED emitters (LED1 and LED2) disposed on opposite sides of the card slot 116, as shown in FIG. 4. The face plate 114 is configured with inclines surfaces 130, 132, with emitter LED1 and sensor SENS1 disposed on surface 130 and emitter LED2 and sensor SENS2 disposed on surface 132. Inclined surfaces 130, 132 are configured at a predetermined angle, e.g., from about 30 degrees to about 60 degrees, relative to a card slot surface 134 to enable the emitters and sensors to communicate to each other and detect objects therebetween. Other angles are also contemplated to be within the scope of the present disclosure. The key aspect of selecting a specific angle is to carefully balance the coupling of the emitters and sensors. For example, emitter LED1 must be sufficiently coupled to sensor SENS2 to enable adequate sensing for measurements across the face of the reader, but sensor SENS1 must normally see very little reflection from emitter LED1 for other measurements, as will be described in more detail below.

In other embodiments, the emitter LED1 and sensor SENS1 will be disposed across from emitter LED2 and sensor SENS2 along the longest length of the slot 116, as shown in FIG. 4A. It is to be appreciated that the emitters and sensors can be positioned anywhere along the face plate as long as the emitters are sufficiently coupled to sensors to enable adequate sensing for measurements across the face of the slot 116 and/or face plate 114. For example, in another embodiment, a face plate 150 is configured as a flat surface without inclined surfaces, as shown in FIGS. 4B and 4C. In this embodiment, the emitters and sensors are disposed on a top surface 152 of the face plate 150 to be exposed enough so that the emitters are sufficiently coupled to the sensors (as shown by the dashed arrow) to enable adequate sensing for measurements across the face of the slot 154 and/or face plate 150.

Activation of the emitters LED1, LED2 and measurement capture by sensors SENS1, SENS2 are controlled by a controller 136 disposed in the housing 112. Four separate measurements (A-D) are made by the controller 136:

A) LED1 emits a pulse of light and SENS1 measures how much light is reflected back. No or low reflection means that no skimming device is present. Low reflection meaning that the light sensed by sensor SENS1 is below a predetermined detection threshold.

B) LED1 emits a pulse of light and SENS2 measures how much light is received. Sufficient light reaching SENS2 means that nothing is blocking the light path, i.e., the light sensed by sensor SENS2 is greater than a predetermined detection threshold.

C) LED2 emits a pulse of light and SENS2 measures how much light is reflected back. No or low reflection means that no skimmer is present. Low reflection meaning that the light sensed by sensor SENS1 is below a predetermined detection threshold.

D) LED2 emits a pulse of light and SENS1 measures how much light is received. Sufficient light reaching SENS1 means that nothing is blocking the light path, i.e., the light sensed by sensor SENS1 is greater than a predetermined detection threshold.

It is to be appreciated that the angle of the inclined surfaces 130, 132 relative to the card slot surface 134 is selected to simultaneously achieve low coupling for measurements A and C, and high coupling for measurements B and D. The detection algorithm then compares the measured values for measurements A, B, C, and D to a stored table of detection thresholds that have been selected through empirical testing. These detection thresholds can be adjusted to make the detection either more sensitive or less sensitive to avoid false-positive or false-negative detection events.

Measurements A and C will typically detect any object that is placed in front of the card slot 116, but these measurements are easily defeated. Simply placing a piece of black tape over the sensors SENS1, SENS2 will eliminate all the reflected light coming back to the sensors, so the detectors will not sense that a skimmer is present.

On the other hand, measurements B and D are actually looking for a certain amount of light to reach the sensor under normal conditions. Placing a skimming device between the two ends of the face plate will block the light transfer across the face of the reader and trigger a detection. This detection can be defeated by building a skimming device that leaves space for light to travel across the face of the reader.

The device, system and method of the present disclosure combines measurements A and C with measurements B and D so that any effort to defeat one method will trigger the other. For example, any effort to defeat measurements A and C by blocking the sensors (such as the black tape method) will trigger measurements B and D. The key aspect of this feature is to use the same emitter for measurements A and B and the same emitter for measurements C and D, and the same sensor for measurements A and D and the same sensor for measurements B and C. It is not possible to block any sensor or emitter and still pass all four tests.

Figure 5:
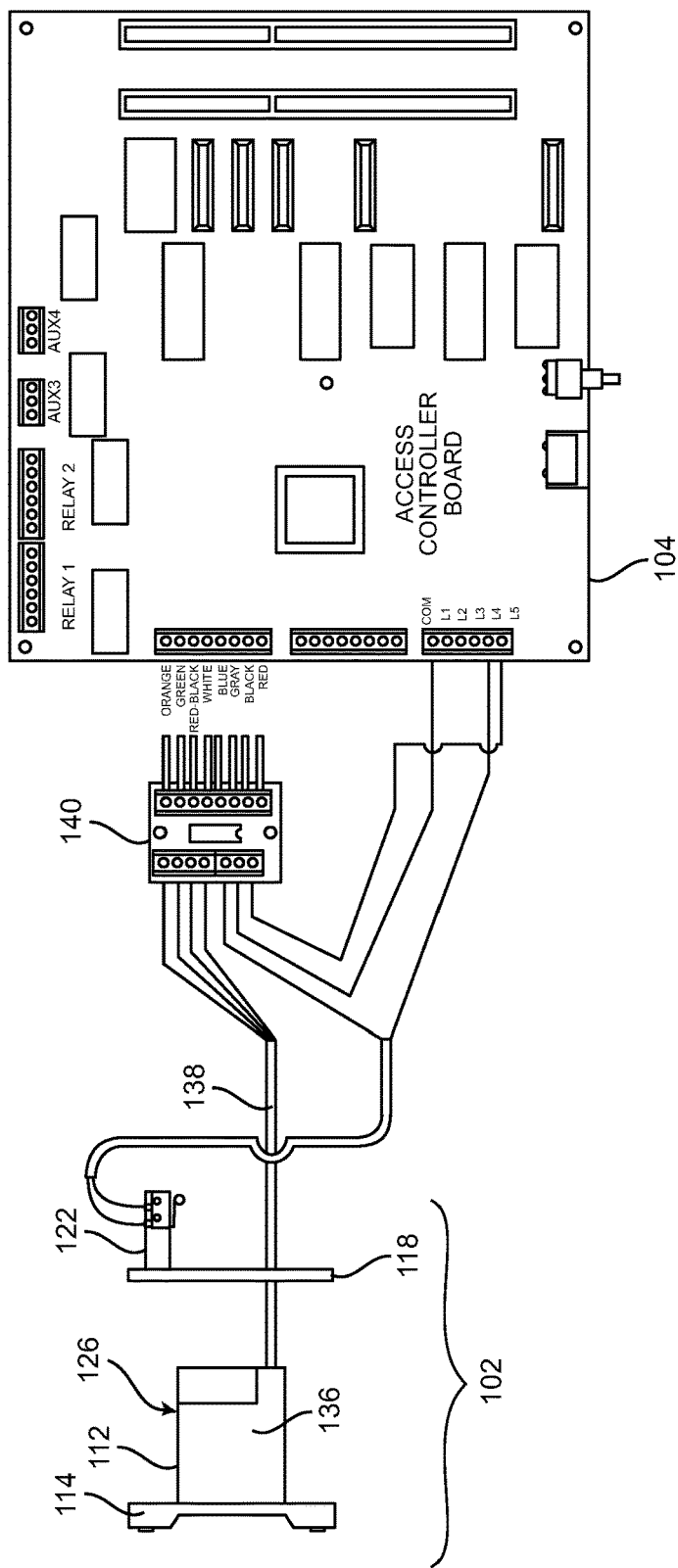
FIG. 5 a schematic diagram of the card reader protection system in accordance with an embodiment of the present disclosure.

The controller 136 activates the emitters LED1, LED2 and sensors SENS1, SENS2 selectively to capture measurements A-D. The controller 136 determines if an object, e.g., a skimming device, has been detected and, upon detection, transmits a signal to the control panel 104 via cable 138, as shown in FIG. 5. In this embodiment, controller 136 is coupled via cable 138 to a second controller 140 located at the control panel 104. The communications between the controller 136 and the second controller 140 is in accordance with the RS-485 protocol and only requires four wires in cable 138, i.e., two for power and two for communications.

It is to be appreciated that the controller 136 also reads data from a magnetic stripe of a card inserted into slot 116 via card reader or sensor 137, shown in dashed lines. In other embodiments, the controller 136 also monitors the status of contact or tamper switch 122. The read card data and tamper status can be multiplexed by the controller 136 over the RS-485 communication link 138 to control panel 104.

It is to be appreciated that other communication methods are contemplated by the present disclosure. For example, the detection determination of controller 136 may be programmed into the control panel 104 eliminating the need for controller 136. In this example, additional wires would be necessary and wired to each emitter and sensor.

In another embodiment, a communication device 142 may be coupled to the controller 136 and disposed in the housing 112. The communication device 142 may be a modem, network interface card (NIC), wireless transceiver, etc. The communication device 142 may couple the controller 136 to a personal computer, the control panel 104, a central station, over a network, e.g., a LAN, WAN, the Internet, etc. The communication device 142 will perform its functionality by hardwired and/or wireless connectivity. The hardwire connection may include but is not limited to hard wire cabling e.g., parallel or serial cables, USB cable, Firewire (1394 connectivity) cables, and the appropriate port. The wireless connection will operate under any of the various known wireless protocols including but not limited to Bluetooth™ interconnectivity, infrared connectivity, radio transmission connectivity including computer digital signal broadcasting and reception commonly referred to as Wi-Fi or 802.11.X (where x denotes the type of transmission), satellite transmission or any other type of communication protocols or systems currently existing or to be developed for wirelessly transmitting data. It is to be appreciated that the network may be a local area network (LAN), wide area network (WAN), the Internet or any known network that couples a plurality of computers to enable various modes of communication via network messages. Furthermore, communication device 142 will communicate using the various known protocols such as Transmission Control Protocol/Internet Protocol (TCP/IP), File Transfer Protocol (FTP), Hypertext Transfer Protocol (HTTP), etc. and secure protocols such as Internet Protocol Security Protocol (IPSec), Point-to-Point Tunneling Protocol (PPTP), Secure Sockets Layer (SSL) Protocol, etc.

Figure 6:
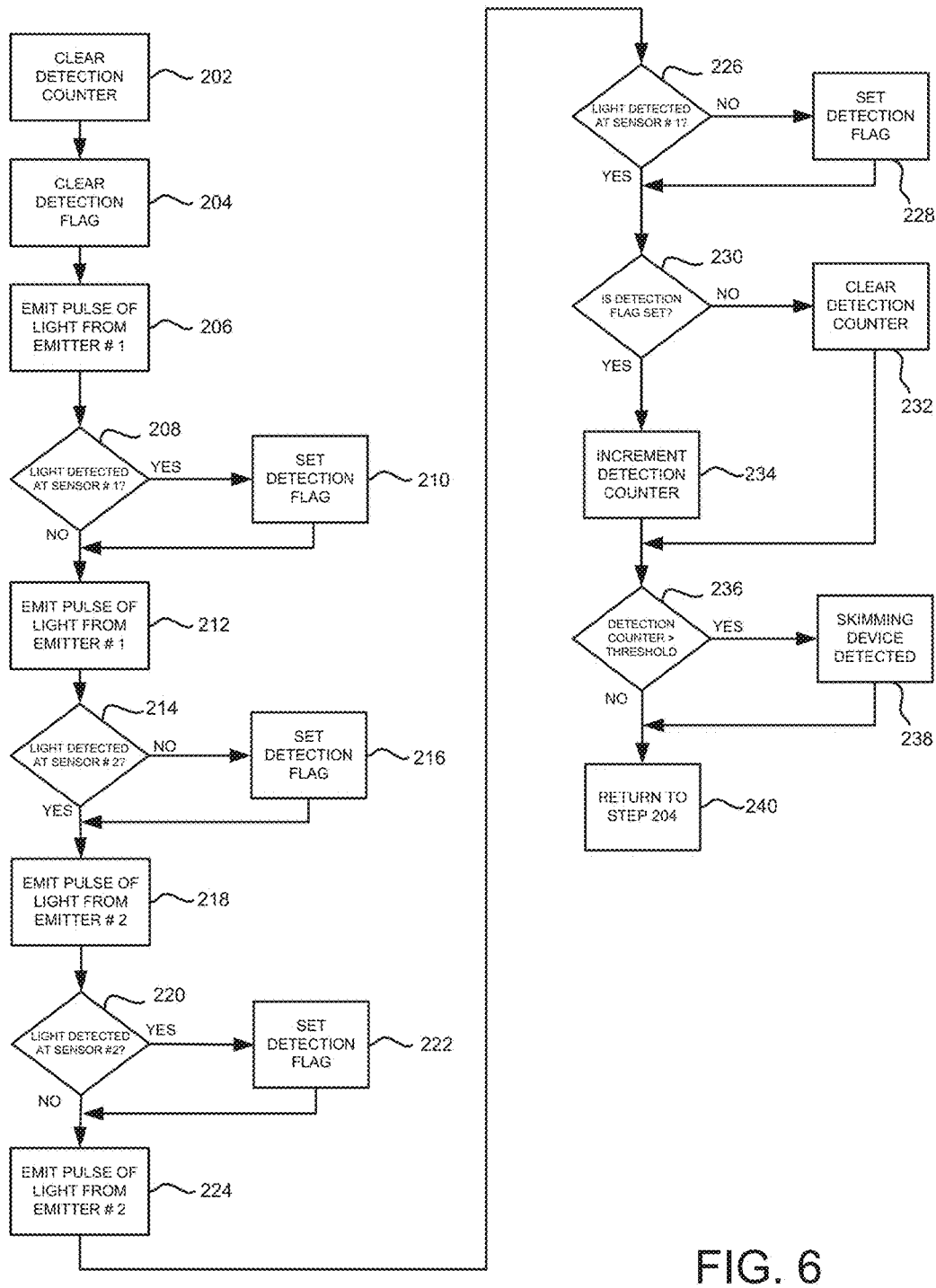
FIG. 6 is a flow chart illustrating a method for detecting a skimming device in accordance with an embodiment of the present disclosure.

Referring to FIG. 6, a method for detecting a skimming device in accordance with an embodiment of the present disclosure is illustrated. Initially, in step 202, a detection counter is initialized or cleared. In step 204, a detection flag is initialized or cleared. Next, a pulse of light is emitted from emitter LED1, step 206. At step 208, it is determined if light is detected at sensor SENS1, i.e., measurement A. If light is detected at sensor SENS1, the detection flag is set, in step 210; otherwise, the method moves to step 212.

In step 212, a pulse of light is emitted from emitter LED1. At step 214, it is determined if light is detected at sensor SENS2, i.e., measurement B. If no light is detected at sensor SENS2, the detection flag is set, in step 216; otherwise, the method moves to step 218.

In step 218, a pulse of light is emitted from emitter LED2. At step 220, it is determined if light is detected at sensor SENS2, i.e., measurement C. If light is detected at sensor SENS2, the detection flag is set, in step 222; otherwise, the method moves to step 224.

In step 224, a pulse of light is emitted from emitter LED2. At step 226, it is determined if light is detected at sensor SENS1, i.e., measurement D. If no light is detected at sensor SENS1, the detection flag is set, in step 228; otherwise, the method moves to step 230.

In step 230, it is determined if the detection flag was set by any of the measurements above, i.e., measurements A, B, C, D. If the detection flag is not set, the detection counter is cleared, in step 232, and the method proceeds to step 236. If it is determined that the detection flag is set in step 230, the detection counter is incremented, step 234. In step 236, it is determined if the detection counter is greater than a predetermined threshold. If the value of the detection counter is less than the predetermined threshold, it is determined that no skimming device is present and the method proceeds to step 240 which loops the method back to step 204. If the value of the detection counter is greater than the predetermined threshold, it is determined that a skimming device has been detected, step 238. After it is determined that the skimming device is detected, the method proceeds to step 240 which loops the method back to step 204 to continuously monitor for a skimming device.

The sequence of the method of FIG. 6 performs all four measurements sequentially, regardless of whether a possible skimmer is detected at any one measurement. The resulting series of steps in the flow chart constitutes a standard "measurement cycle" that is repeated at a periodic interval, e.g., about seven seconds, but the length of this interval is not critical.

Since normal user operation of the card reader assembly 102 will typically trigger detection on one or more measurement cycles, no action is taken unless a large number of successive measurement cycles each show a possible skimming device, i.e., the detection counter is greater than the predetermined threshold at step 236. In one embodiment, the predetermined detection counter threshold will be correlated to a time interval, i.e., the threshold value is selected to be the number of times continuous detection can be determined in a given time period. In one embodiment, the present algorithm looks for 30 minutes of continuous detection, although the 30-minute interval is a configurable parameter. In other words, a skimmer alarm is only declared if every measurement cycle for the last 30 minutes showed a possible skimming device detected on one or more of the four measurements in each measurement cycle.

It is to be appreciated that the predetermined detection counter threshold is selected to screen out the momentary detections that will occur during normal use of the card reader assembly, and trigger an alarm only if there is a sustained detection that would indicate a skimming device has been attached. However, the screening method described above can be done with a variety of algorithms, and the teachings of the present disclosure is not meant to be limited to the specific screening algorithm described above. For example, in another embodiment, the algorithm would look for a "preponderance" of detection events over a given interval, in contrast to continuous detection.

Although the method of FIG. 6 illustrates each measurement, e.g., measurements A, B, C, D, being taken sequentially, other sequences and measurements are contemplated. For example, measurements A and B can be taken simultaneously by sensors SENS1 and SENS2 with emitter LED1 emitting light. Likewise, measurements C and D can be taken simultaneously by sensors SENS1 and SENS2 with emitter LED2 emitting light. It is to be appreciated that in this embodiment, several steps shown in FIG. 6 can be eliminated.

It is to be appreciated that employing infra-red proximity detection, where the amount of light reflected off an object is measured, involves measuring very low levels of light. This is the measurement mode used for measurements A and C, described above. Reflectance-based proximity detection is particularly difficult if the object being detected is black, since very little light reflects off of a black object. Therefore, detecting a black object by measuring the light that reflects off of it requires an exquisitely sensitive sensor. However, normal sunlight contains extraordinary amounts of infra-red light. As a result, normal sunlight will typically overwhelm a sensitive infra-red detector and effectively blind it. On the other hand, if the sensor is configured to be less sensitive so that direct sunlight does not blind it, the resulting sensitivity would be too low to detect black objects, e.g., a black skimming device.

To overcome these shortcomings, the device and method of the present disclosure performs each measurement (namely, measurements A, B, C, D) at six different sensitivity settings. Furthermore, the device and method determines when a particular sensor is being blinded by excessive light and sets a flag to indicate it has become saturated (i.e., blinded). In this manner, the device and method determines when the particular sensor is being blinded and ignores the false readings that resulted from that condition.

In one embodiment, the controller 136 makes each measurement at six different sensitivity settings, and then simply ignores the results of any measurement where the sensor was blinded or saturated. Sensitivity Level 1 is a low sensitivity configuration that operates reasonably well in direct sunlight but can not detect black objects. Sensitivity Level 6 is an extremely sensitive configuration that detects black objects in an environment with low ambient light, but is completely blinded by even modest levels of sunlight. Sensitivity levels 2, 3, 4, and 5 are evenly spaced between these two extremes.

In use, the low sensitivity settings perform well when detecting objects in direct sunlight, while the high sensitivity settings perform well when detecting black objects in low ambient light. For example, in a worst-case scenario where a black skimming device is placed over (but not on) the slot, the skimming device will also block ambient sunlight, however, the more sensitive settings will allow the controller 136 to get a valid measurement.

While the flow chart of FIG. 6 shows only four measurements A, B, C, and D being made, in certain embodiments, each of the four measurements is made at six different sensitivity levels, for a total of 24 separate measurements. Any measurement where the sensor reports saturation (i.e., blinding) is ignored. This approach naturally compensates for the wide variation in ambient light. In essence, whatever measurements can succeed without saturation are used to detect a skimming device, and any measurements that experience saturation are ignored. This method handles the full range of ambient light conditions with the full range of possible skimmers, e.g., skimming device of different colors or material.

In one embodiment of the present disclosure, card reader assembly 102 may be configured as a multi-media reader for use with contactless transactional technologies in addition to being able to read the magnetic strips disposed on various cards. As seen in FIGS. 1 and 3, card reader assembly 102 may include an antenna that can detect NFC/RFID enabled devices and smart cards (e.g., EMV cards) using NFC/RFID technologies that are in close proximity to the card reader assembly 102.

Figure 7D:
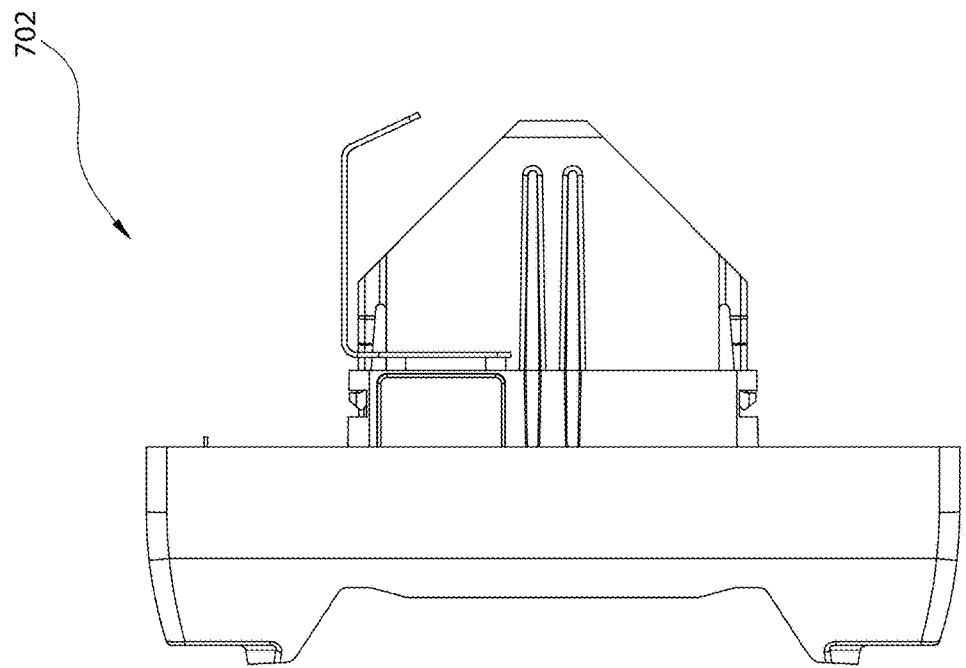
FIG. 7D is a side view of the MMR device of FIG. 7A in accordance with an embodiment of the present disclosure.
Figure 7C:
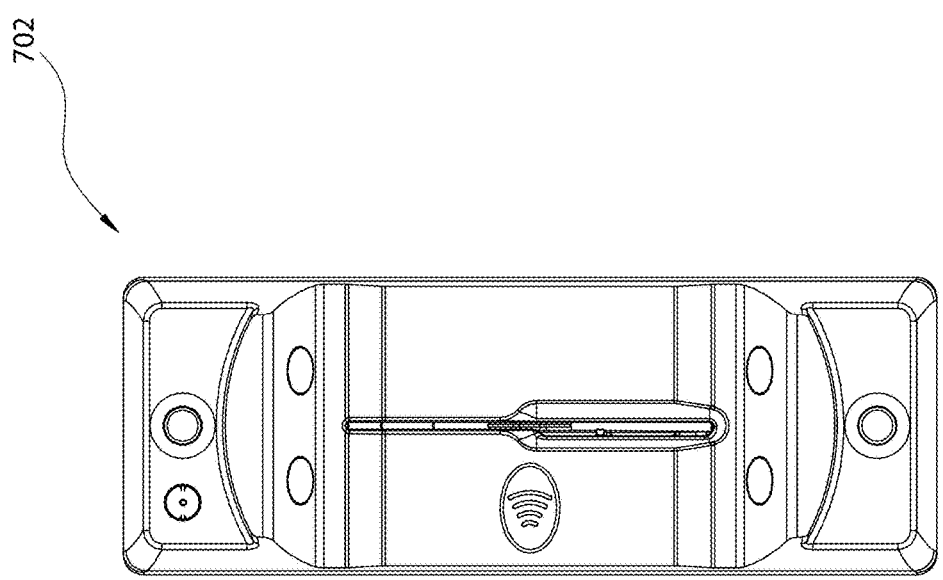
FIG. 7C is a front view of the MMR device of FIG. 7A in accordance with an embodiment of the present disclosure.
Figure 8A:
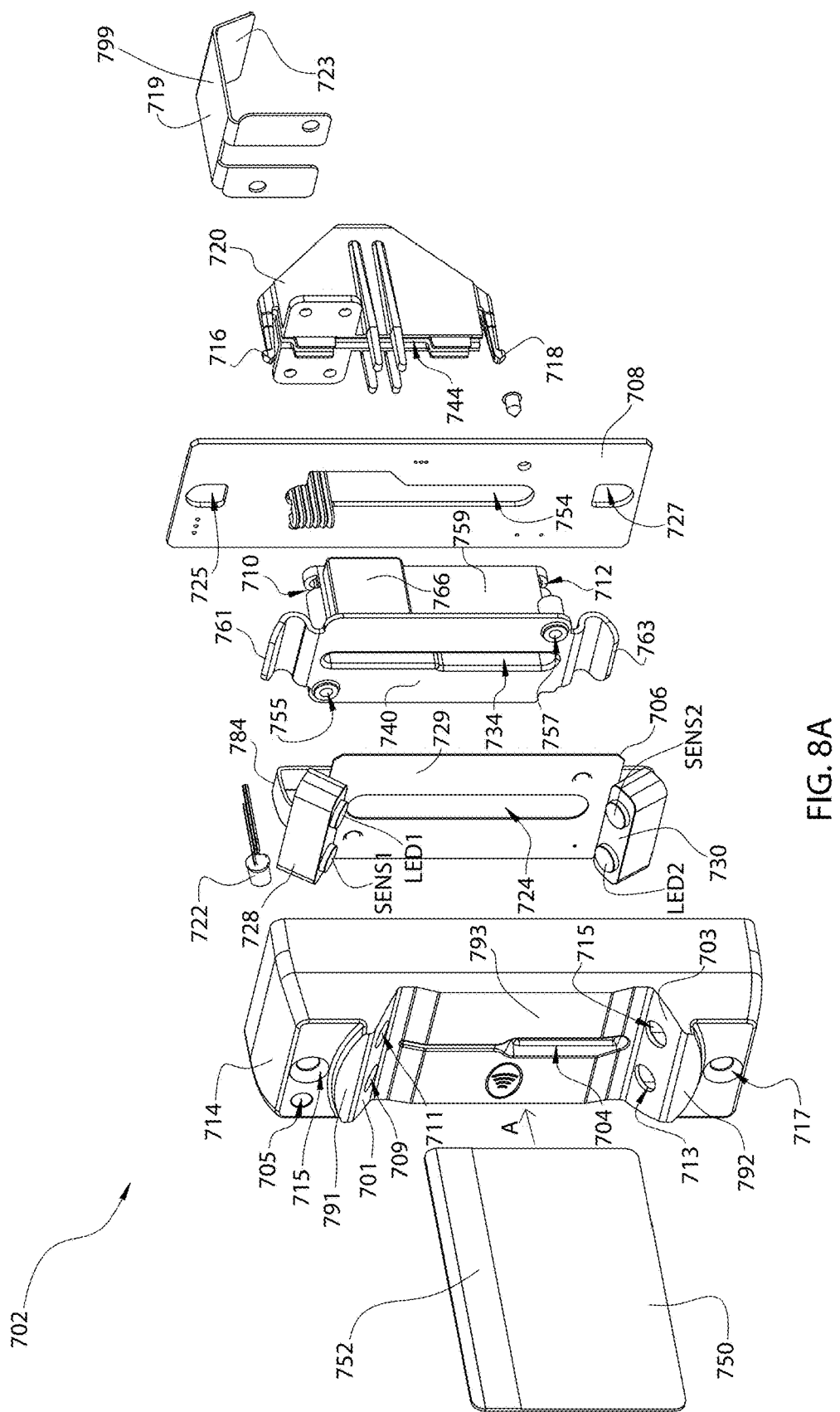
FIG. 8A is an exploded perspective view of the MMR device as shown in FIG. 7A in accordance with an embodiment of the present disclosure.
Figure 8B:
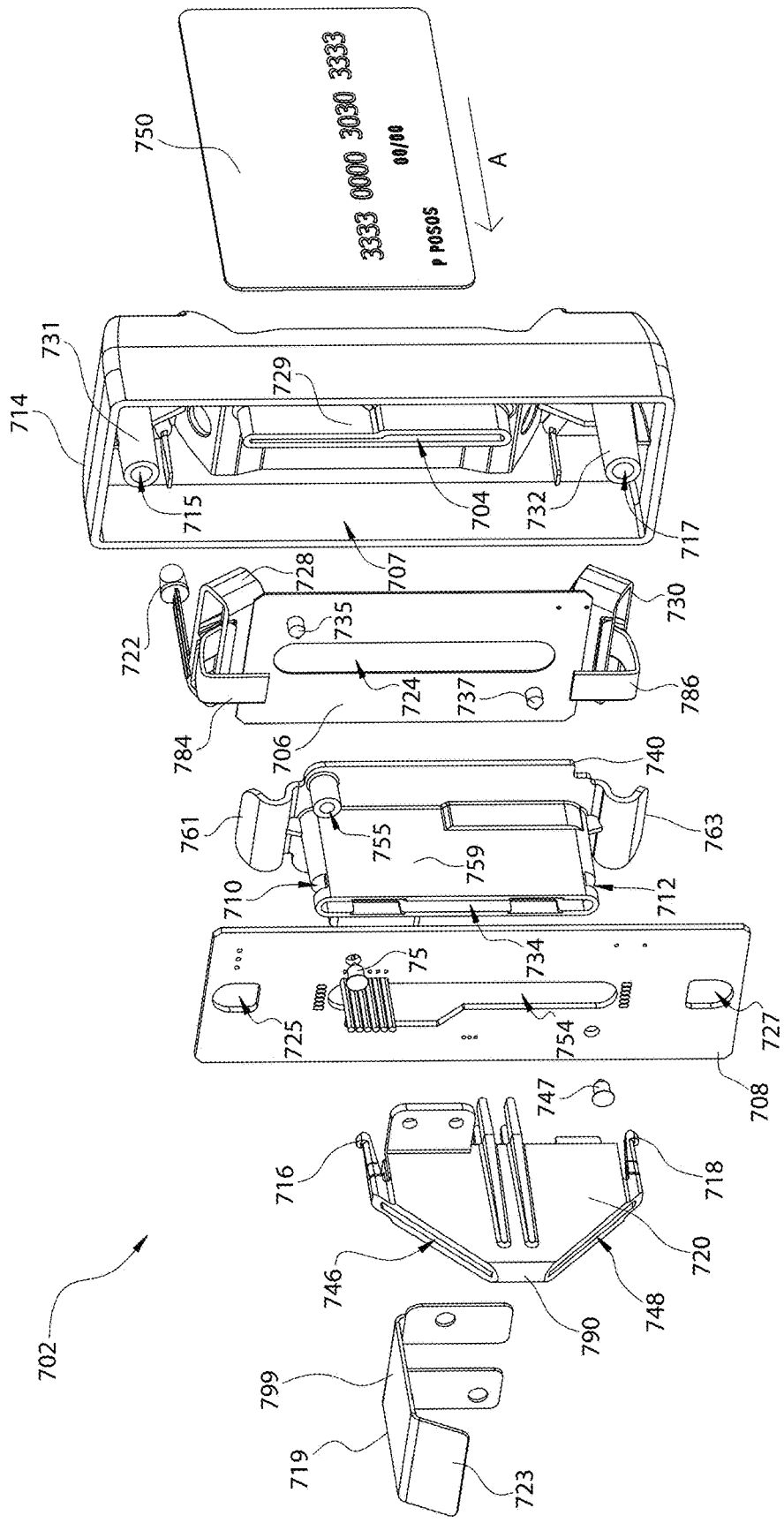
FIG. 8B is another exploded perspective view of the MMR device as shown in FIG. 7A in accordance with an embodiment of the present disclosure.

For example, referring to FIGS. 7-8, a multi-media reader (MMR) assembly 702 configured for contactless transactional technologies is shown in accordance with the present disclosure, where FIG. 7A is a front perspective view of MMR assembly 702, FIG. 7B is a rear perspective view of MMR assembly 702, FIG. 7C is a front view of MMR assembly 702, FIG. 7D is a side view of MMR assembly 702, FIG. 8A is an exploded front perspective view of MMR assembly 702, and FIG. 8B is an exploded rear perspective view of MMR assembly 702. As will be described below, the MMR assembly 702 is configured to read information from the Track 2 of a magnetic stripe card (such as magnetic stripe 752 of card 750) and interact with various Near Field Communication (NFC) and Radio Frequency Identification (RFID) based contactless devices, such as, but not limited to, EMV cards and mobile/wearable technology using one of various NFC/RFID protocols (or other short range communication protocols), such as, but not limited to, 156933, 14443 A & B, and FeliCa. In some embodiments, MMR 702 is also configured to include Bi-directional Bluetooth (for pairing), Bluetooth low energy (BLE), and WiFi capabilities for interacting with other devices and/or cards.

MMR assembly 702 includes a faceplate or housing 714, antenna 706, printed circuit board (PCB) 708, frame 740, card stop 720, tamper trigger component 719. Faceplate 714 includes channels 715 and 717 extending through tubular members 731, 732, respectively. Faceplate 714 includes an interior 707, where tubular members 731, 732 extend into interior 707. Channels 715, 717 are configured to receive screws or other securing means to mount faceplate 714 to a desired location, such as location 110 (as described below). Faceplate 714 also includes an extension member 729, which extends (along a direction of entry A) into interior 707 of faceplate 714. A slot 704 is disposed through extension member 729 and is configured to receive a magnetic stripe card 750 in a direction of entry A (shown in FIG. 8A).

As seen in FIGS. 7B and 8B, the rear side of apertures 715 and 717 are configured to be received by apertures 725 and 727 of PCB 708 to couple PCB 708 to the interior 707 of faceplate 714 when faceplate 714 is mounted to a desired location, such as location 110. Furthermore, faceplate 714 includes raised surfaces 791, 792, and 793. In one embodiment, raised surface 793 tightens the overlay detection range to a material thickness of approximately 0.40 inches, however other ranges are contemplated as well. Also, the raised areas 791 and 792 are configured to break up the flat surface areas of assembly 702 to make it more difficult to create an overlay skimming device when assembly 702 is used.

Figure 10:
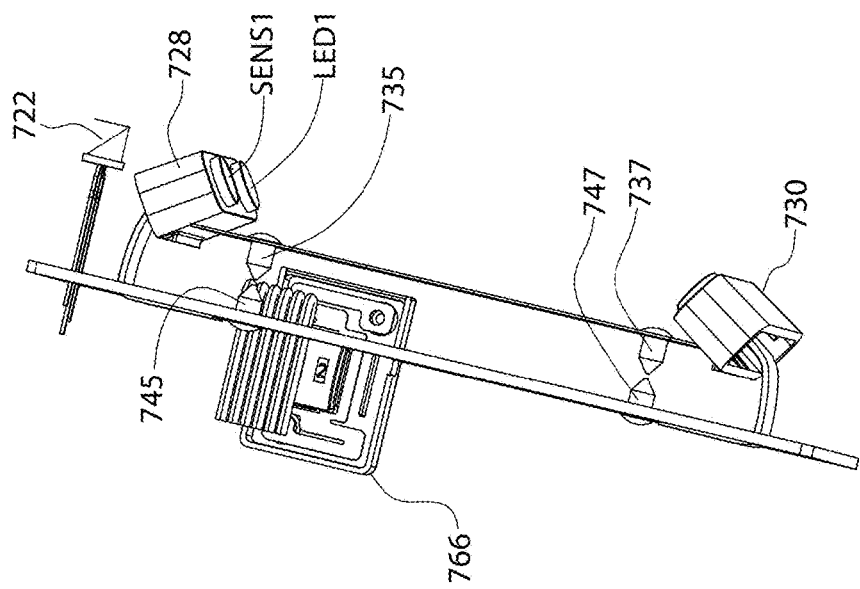
FIG. 10 is a side view of some of the internal components of the MMR device of FIG. 7A in accordance with an embodiment of the present disclosure.
Figure 9:
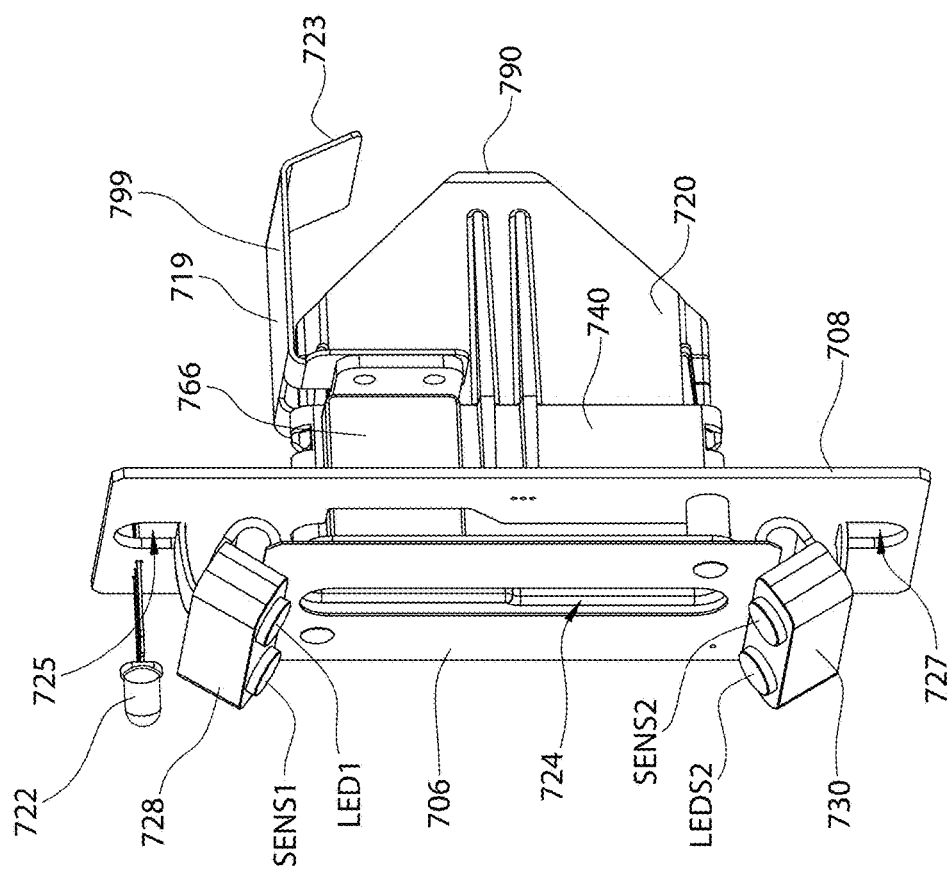
FIG. 9 is a perspective view of the internal components of the MMR device of FIG. 7A in accordance with an embodiment of the present disclosure.

PCB 708 includes a slot 754 and is coupled LED 722, sensor module 728 (via cable 784, which is disposed through aperture 725 of PCB 708, as seen in FIGS. 7B and 9), sensor module 730 (via cable 786, which is disposed through aperture 727 of PCB 708, as seen in FIGS. 7B and 9), posts 745, 747 (shown in FIG. 10). Antenna 706 includes slot 724 and is coupled to posts 735, and 737 (shown in FIG. 10). Frame 740 includes slot 734, which is disposed through an extension member 759 extending along the direction of entry A. Frame 740 further includes apertures 710, 712, 755, 757, and sensor supports 761, 763. Card stop 720 includes tabs 716 and 718 and slot 744 and apertures 746, 748. It is to be appreciated that card stop 720 (and thus slot 744) is aligned along the direction of entry A. Slot 754 of PCB 708 is configured to receive extension member 759 of frame 740 and slot 734 is configured to receive extension member 729. When extension member 759 has been received by slot 754, tabs 716 and 718 of card stop 720 are configured to interact with apertures 710 and 712 of frame 740, respectively, to couple card stop 720 to frame 740, such that slot 744 of card stop 720 aligns with slot 734.

As shown in FIG. 8A, a magnetic stripe reader assembly 766 is coupled to a side of extension member 759, such that, when a card 750 is inserted through slot 704 in direction A, as card 750 passes through slot 734 of frame 740, the information on magnetic stripe 752 is read by magnetic stripe reader assembly 766 and provided to a processor of MMR 702 that is coupled to PCB 708. It is to be appreciated that when antenna 706 is coupled to frame 740 and PCB 708, slot 734 is configured to align with slot 754 and receive card reader assembly 766 (shown in FIG. 10). Also, aperture 755 aligns with posts 735 and 745, such that posts 735 and 745 are disposed inside aperture 755, and aperture 757 aligns with posts 737 and 747, such that posts 737 and 747 are disposed inside aperture 757. It is to be appreciated that antenna 706, frame 740, and PCB 708 can best be seen coupled to each other in FIG. 9 and that posts 735, 737, 745, and 747 can be most easily seen in FIG. 10.

Sensor modules 728 and 730 each include at least one infrared sensor (SENS 1/SENS 2) and one infra-red LED emitter (LED 1/LED 2), where sensor module 728 includes LED 1 and SENS 1 and sensor module 730 includes LED 2 and SENS 2 (as shown in FIG. 9). It is to be appreciated that when antenna 706, frame 740, and PCB 708 are coupled together, sensor supports 761 and 763 are disposed between antenna 706 and PCB 708 to provide support for sensor modules 728 and 730. Specifically, support 761 provides support for sensor module 728 and helps secure sensor module 728 in the position shown in FIGS. 8A, 8B, 9, and 10 (i.e., at an acute angle relative to PCB 708 and antenna 706). Furthermore, support 763 provides support for sensor module 730 and helps secure sensor module 730 in the position shown in FIGS. 8A and 9 (i.e., at an acute angle relative to PCB 708 and antenna 706).

When PCB 708 is coupled to antenna 706, frame 740, and card stop 720, and PCB 708 is coupled to face plate 714 and disposed in the interior 707 of faceplate 714, LED 722 is received by aperture 705, LED1 and SENS1 of sensor module 728 are received by apertures 709, 711, respectively, and LED2 and SENS2 of sensor module 730 are received by apertures 713, 715, respectively. Furthermore, when MMR assembly 702 is fully assembled (as shown in FIGS. 7A-7B), slots 704, 724, 734, 754, and 744 align along direction of entry A, such that, a magnetic stripe card 750 can be inserted into slot 704 of faceplate 714 through slots 724, 734, 754, and 744, until the corners of card 750 exit through apertures 746 and 748 of card stop 720 and the card 750 cannot be advanced anymore when card 750 meets end 790 of card stop 720. As described above, when magnetic stripe card 750 is disposed through slots 704, 724, 734, 754, 744, as magnetic stripe 752 of card 750 travels along direction A, reader assembly 766 is configured to read the information stored on stripe 752 of card 750.

In one embodiment, MMR 702 includes a tamper trigger component 719 that is coupled to frame 740 (as best seen in FIG. 7B). Tamper component 719 includes a flat portion 799 and an inclined surface 723. As shown in FIG. 7B, flat portion 79 of tamper component 719 extends along direction of entry A (indicated in FIG. 8A), where inclined surface 723 forms an acute angle relative to flat portion 799. In one embodiment, MMR 702 further includes a mounting bracket used to mount MMR 702 to an area 110, where the mounting bracket further includes a tamper switch. In this embodiment, tamper component 719 is configured to interact with tamper switch to ensure that MMR 702 has not been unmounted from an area 110 by an unauthorized entity. For example, referring to FIG. 11, a perspective view of MMR 702 and a mounting bracket 751 of MMR 702 is shown in accordance with an embodiment of the present disclosure. Mounting bracket 751 includes an opening 756 configured to receive card stop 720 and mounting component 719 when MMR 702 is mounted to area 110. Mounting bracket 751 includes a tamper switch 733 that is configured to interact with tamper component 719. Mounting bracket 751 is configured to be mounted to area 110, and housing 714 is configured to be coupled to mounting bracket 751, such that, tamper component 719, card stop 720, and at least a portion of frame 740 are disposed through opening 756 into cutout 124 of area 110.

Tamper switch 733 includes leads 736, button 738, lever 739, and wheel 741. One or more leads 736 are coupled to a controller 836 (described below). Lever 739 is configured to pivot about tamper switch 733 in a direction toward tamper switch 733 or away from tamper switch 733. When lever 739 is pivoted toward tamper switch 733, lever 739 is configured to press button 739. When lever 739 is pivoted away from tamper switch 733, lever 730 is configured to depress button 739. It is to be appreciated that lever 739 is biased away from tamper switch 733, such that, lever 733 only contacts and pressed button 739 when a force is exerted on wheel 741.

Figure 11:
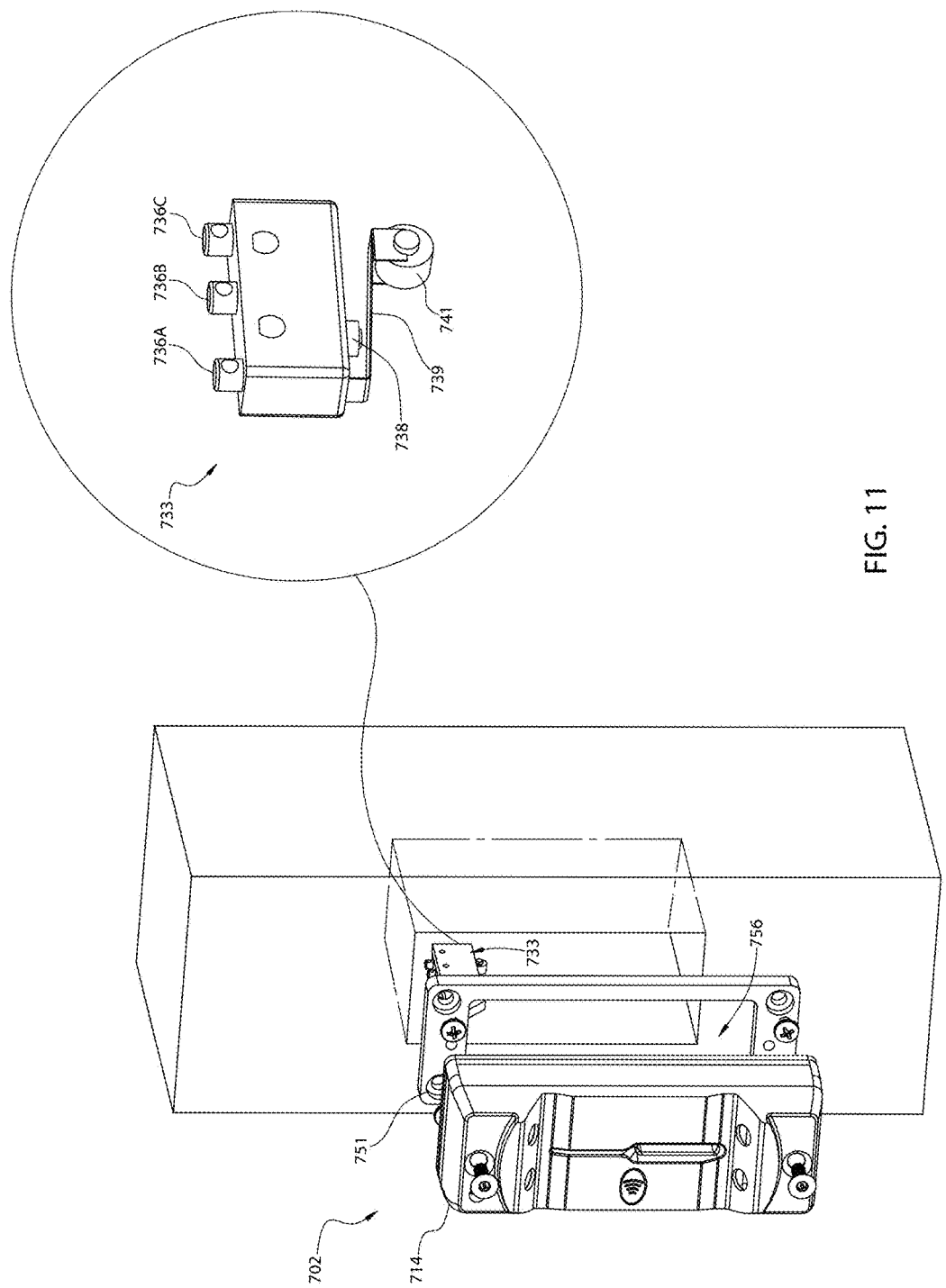
FIG. 11 is a perspective view of the MMR device of FIG. 7A and a tamper bracket in accordance with an embodiment of the present disclosure.

As shown in FIG. 11, tamper switch 733 extends into cutout 124 (in a direction away from housing 714) when mounting bracket 751 is mounted to area 110. When housing 714 is coupled to mounting bracket 751, inclined portion 723 of tamper component 799 comes into contact with wheel 741 of tamper switch 733 and wheel 741 rolls up inclined portion 723 (in a direction toward flat portion 799) until wheel 741 reaches flat portion 799. When wheel 741 reaches flat portion 799, lever 739 is pivoted toward button 738 causing button 738 to become pressed by lever 739. Tamper switch 733 is configured such that as along as button 738 is pressed by lever 739, tamper switch 733 does not output any signals. However, if an attempt is made to remove housing 714 of MMR 702 from area 110, tamper trigger component 719 will also be removed from area 110, causing button 738 of tamper switch 733 to become depressed as flat portion 799 and inclined portion 723 are drawn away from wheel 741, causing the force exerted on wheel 741 to be removed and lever 739 to be pivoted away from tamper switch 733 and button 738. When button 738 is depressed, tamper switch 733 is configured to send a signal to controller 836 (e.g., via the wires (not shown) connecting leads 736 to controller 836) to alert controller 836 that MMR 702 has been tampered with.

Referring again to FIGS. 8-10, in one embodiment, antenna 706 is configured as an NFC interrogator that is capable of sending and receiving information from another NFC interrogator (e.g., disposed in an NFC enabled mobile device, such as, a smart phone or smart watch) and read (i.e., interrogate) information from an NFC tag (e.g., including in a smart card or EMV card). As will be described below antenna, antenna 706 is coupled to PCB 708 and is configured to be controlled by a controller of PCB 708 to send and receive NFC data as desired.

When MMR 702 is fully assembled, the planar surface 729 of antenna 706 is disposed in the interior 707 of faceplate 714 in a direction toward surface 793 of faceplate 714. Antenna 706 is configured to project a magnetic field in a direction away from surface 793, such that, when an NFC enabled device or card is placed in an area proximate to surface 793, antenna 706 can detect and interrogate or communicate with the NFC enabled device or card. For example, referring to FIG. 12A, a mobile device 918 including NFC capabilities is shown placed proximately to surface 793 of MMR 702. As mobile device 918 is advanced toward surface 793, antenna 706 is configured to interrogate the NFC chipset, tag, or antenna within mobile device 918 to initiate a communication session (as will be described in greater detail below). As another example, referring to FIG. 12B, an NFC enabled card 760 is shown placed proximately to surface 793 of MMR 702. As NFC enabled card 760 is advanced toward surface 793, antenna 706 is configured to interrogate the NFC chipset or tag within NFC enabled card 760 to initiate a communication session (as will be described in greater detail below).

Referring to FIG. 13A, a block diagram of MMR assembly 702 is shown in accordance with the present disclosure.

Although not shown in FIGS. 7-12, in one embodiment, PCB 708 includes a controller 836 (shown in FIG. 13A). As seen in FIG. 13A, controller 836 is coupled to sensor modules 728,730, tamper switch 733, magnetic stripe reader 766, LED 722, NFC chipset 806, antenna 706 (via chipset 806), accelerometer 802, Bluetooth module 805, and communication module 807. In one embodiment, chipsets 805, 806 may be included in controller 836. In one embodiment, chipsets 805, 806 may be included in communication module 807. Furthermore, in some embodiments, communication module 807 is further coupled to controller 104 (which, as described above, is in communication with alarm monitoring central station 106) and network 906 (which, will be described in greater detail below. It is to be appreciated that communication module 807 may be configured to communication any one of various wireless and wired communication protocols in use today, such as, but not limited to, WiFi, Ethernet, Serial, Cellular, 3G, 4G, etc.

As described above, MMR assembly 704 is configured to read information from the track 2 of magnetic stripe cards using reader 766. For example, when card 750 is inserted into aperture 704 of MMR assembly 702, magnetic stripe reader 766 reads the information stored in magnetic stripe 752 of card 750. Magnetic stripe reader 766 then transmits the information in magnetic stripe 752 to controller 836, where controller 836 can use the information for authentication purposes (for example, to open a door or to use an ATM) or to complete a transaction (to pay for a purchased item or service via a Debit/Credit account). In one embodiment, controller 836 does not perform any analytical process on the Track 2 magnetic stripe card data read from magnetic stripe 752, controller 836 merely reads the data and transmits the data via communication module 807 to controller 104, a point of sale (POS) terminal or system, and/or to one or more servers (as will be described below).

It is to be appreciated that sensor module 728 (including LED1 and SENS1) and sensor module 730 (including LED2 and SENS2) work together with controller 836 in a similar manner to controller 136 and LED1, LED2, SENS1, SENS2 of assembly 102. Therefore, MMR assembly 702 can provide protection against a skimming device, and the like, placed over surface 793, in a similar manner to assembly 102.

Controller 836 is further configured to monitor tamper switch 733. As described above, if an attempt is made to remove housing 714 of MMR 702 from area 110, tamper trigger component 719 will also be removed from area 110, causing button 738 of tamper switch 733 to become depressed. When button 738 is depressed, tamper switch 733 is configured to send a signal to controller 836 (e.g., via the wires (not shown) connecting leads 736 to controller 836) to alert controller 836 that MMR 702 has been tampered with. Controller 836 may then communicate the alert via communication module 807 to controller 104 and/or any other relevant entity via network 906.

In one embodiment, MMR assembly 702 includes accelerometer 802 as a back-up for tamper switch 733. Accelerometer 802 may be coupled to PCB 708. Accelerometer 802 is configured to detect if MMR 702 has been moved and will provide a signal to controller 836 if MMR assembly 702 is moved in any way. For example, in one embodiment, accelerometer 802 is a three-axis capacitive accelerometer configured with real-time orientation detection, motion detection, and shock and vibration monitoring. Controller 836 is configured such that if the signal received from the accelerometer 802 indicates a value above a certain threshold (e.g., detects that the MMR assembly 702 has been moved or struck in some way), controller 836 will send an alert to controller 104 or to any other relevant entity via network 906. It is to be appreciated that, in some embodiments, both accelerometer 802 and tamper switch 733 may be employed concurrently to ensure at least one of accelerometer 802 and tamper switch 733 detect a tamper condition that is occurring and provide a signal to controller 836.

Figure 12A:
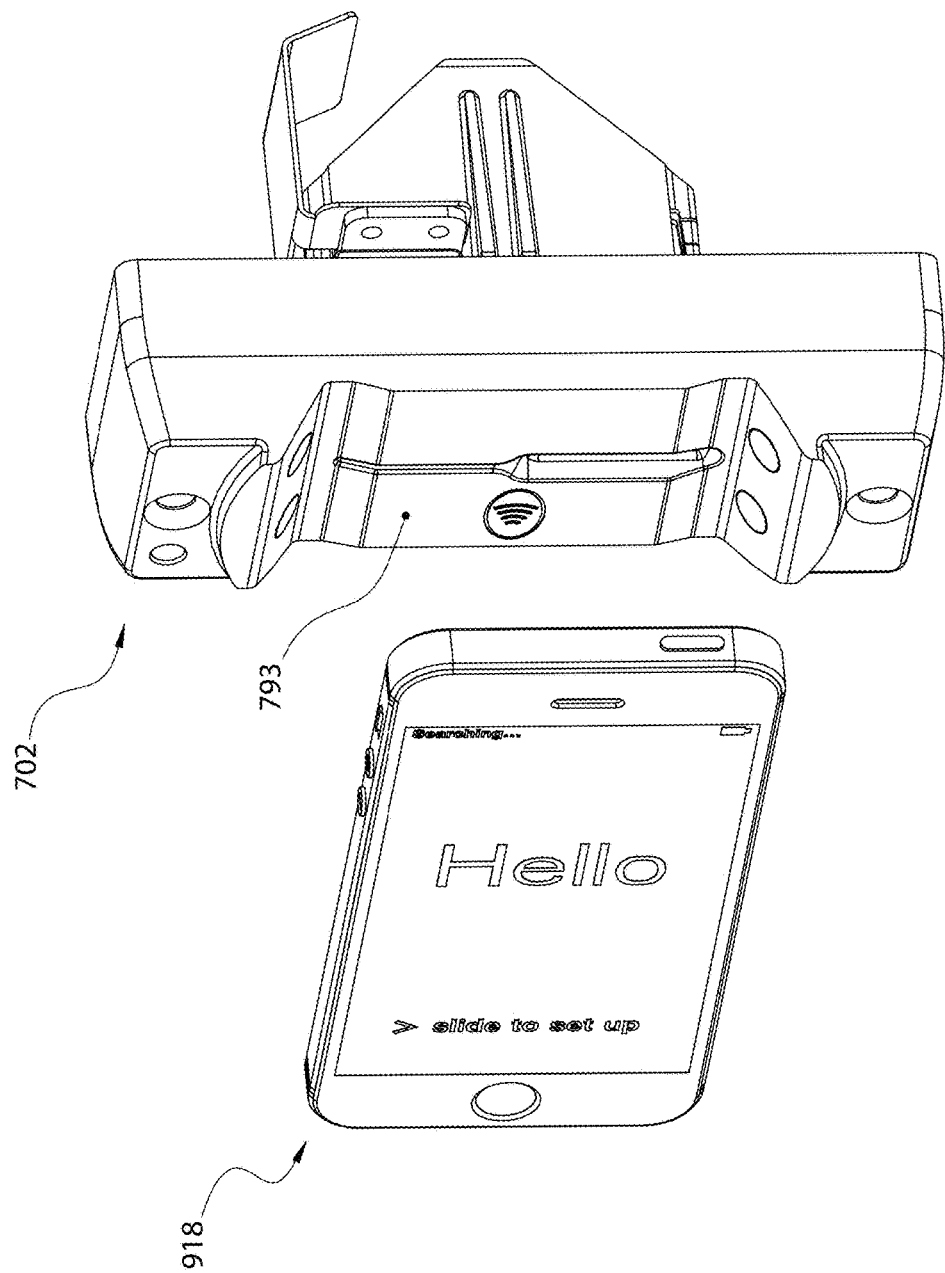
FIG. 12A is a perspective view of the MMR device of FIG. 7A and a mobile device in accordance with an embodiment of the present disclosure.
Figure 12B:
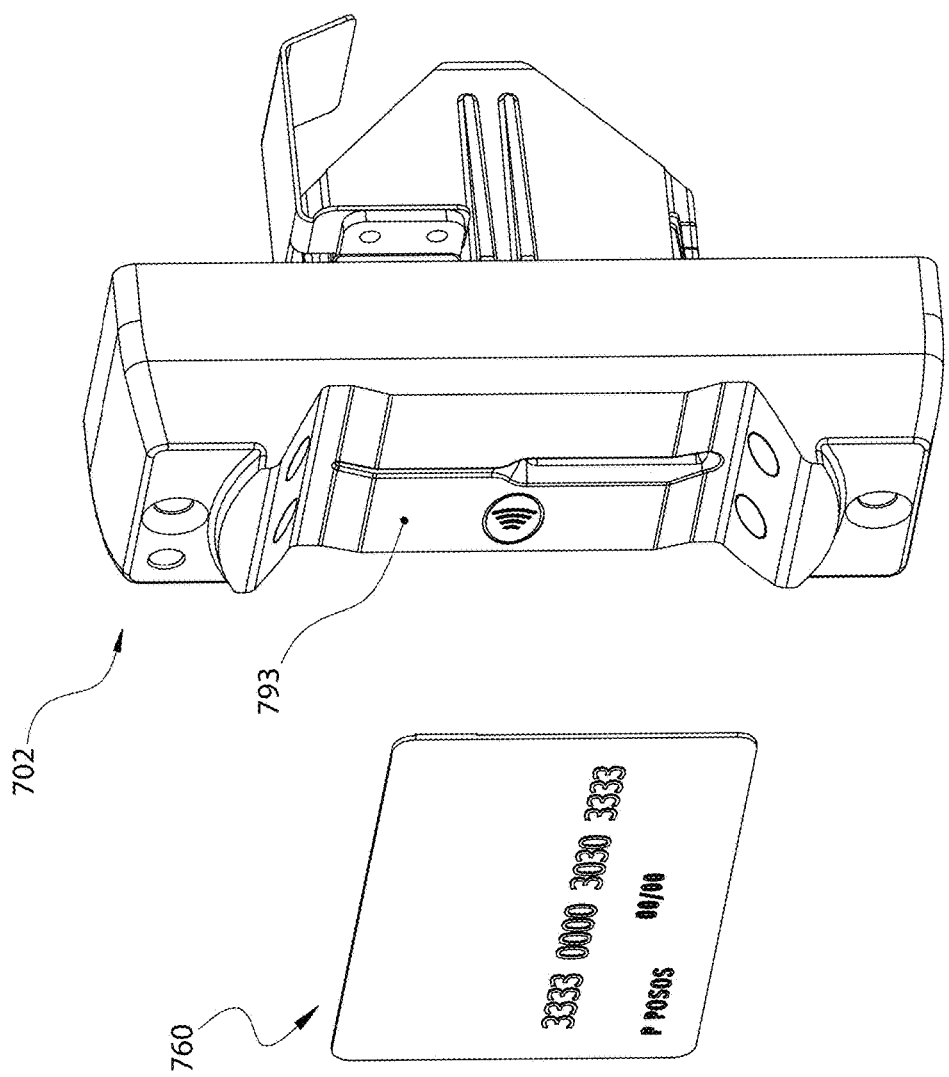
FIG. 12B is a perspective view of the MMR device of FIG. 7A and a card in accordance with an embodiment of the present disclosure.

As stated above, the MMR assembly 702 is configured such that, in addition to being able to read the information of a magnetic stripe, such as magnetic stripe 752, MMR assembly 702 also includes antenna 706 and NFC chipset 806 to interact with various RFID/NFC based contactless EMV cards and RFID/NFC based mobile/wearable technologies (such as smart watches and smart phones with NFC capabilities). For example, if a user places an NFC enabled device, such as a contactless EMV card containing a chip or a mobile device with NFC capabilities, such as a smartphone or smartwatch, in close proximity (e.g., in one embodiment, within 5 centimeters) to the surface 793 of faceplate 714 between apertures 711 and 713 (as shown in FIG. 12A), NFC antenna 706 is configured to detect wireless signals associated with NFC communication. Furthermore, NFC antenna 706 is configured to transmit the wireless signals to NFC chip set 806, where NFC chip set 806 is configured to analyze the received NFC signals and initiate an NFC communication session, as will be described below. It is to be appreciated that NFC chip set 806 is configured for use with all known NFC communication protocols, such as, but not limited to, 15693, 14443 A & B, and FeliCa to interact with any contactless EMV cards and mobile devices that utilize NFC. It is to be appreciated that there is no specific application required to be stored on a mobile device that is in communication with MMR assembly 702, since MMR assembly 702 interfaces with the hardware of the mobile device. However, as will be described below, in some embodiments the mobile device may include an MMR application configured to interface with MMR 702 and be auto-launched when the mobile device is placed in close proximity to MMR 702.

Antenna 706 and NFC chipset 806 implement a fast loop to probe RF fields proximate to the MMR assembly 702 via a set of commands defined within the utilized communication protocols of the NFC circuit. The NFC protocols can be selected to be implemented individually or in a sequencing group. It is to be appreciated that the NFC chipset 806 and controller 836 utilize the pre-activation session of the NFC communication protocols. When a contactless EMV card or a smartphone/wearable device that is NFC enabled, enters the proximate RF field created by antenna 706, antenna 706 will become energized and, together with NFC chipset 806, will respond to the base set of hardware commands as defined within the 14443 A & B entry level communication protocol. The set of commands/responses at this "pre-activation level" establish: (1) device recognition, (2) data exchange format, and (3) capability.

In one embodiment, controller 836 is configured to control and assign LED 722 to output different colors to indicate the state of the MMR assembly 702 while in use. For example, when the MMR assembly 702 is waiting to be used (i.e., for a card 750 to be inserted into aperture 704 or for an NFC/RFID enabled device or card to be placed close to the surface of faceplate 714) controller 836 is configured to make LED 722 output a first color (e.g., in one embodiment, the color amber). If either the magnetic stripe reader 726 or NFC chip set 806 detect a valid input (i.e., an authorized card or NFC enabled device), the controller 836 is configured to make LED 722 output a second color (e.g., in one embodiment, the color green). If either the magnetic stripe reader 726 or NFC chip set 806 detect an invalid input (i.e., an unauthorized card or NFC enabled device), the controller 836 is configured to make LED 722 output a third color (e.g., in one embodiment, the color red).

A communication session may also be initiated between MMR 702 and another device via Bluetooth module 805. It is to be appreciated that Bluetooth module 805 may include a chipset for either or both bidirectional Bluetooth communication (i.e., for Bluetooth pairing) and/or BLE communication. Bluetooth module 807 805 is configured to scan the proximate area (e.g., with a range up to 30 meters) around MMR 702 for other devices that have BLE enabled. In this way, controller 836 of MMR 702 may communicate with other devices via Bluetooth module 807 805. In some embodiments, BLE communication may be used by controller 836 instead of, or in addition to NFC/RFID and magnetic stripe data to exchange information with another device (e.g., user credentials, such as, passwords, ID numbers, etc.) In some embodiments, chipset 805 may be configured as a classic Bluetooth chipset to support previous Bluetooth protocols predating BLE.

In one embodiment, controller 836 of MMR assembly 702 is configured to periodically initiate a contact protocol to scan to detect (using antenna 706 and chipset 806) any RF fields activated by an unauthorized contactless RFID reader installed near MMR assembly 702. If controller 836 detects any meaningful contactless communication with the unauthorized contactless reader, controller 836 will transmit an alert to controller 104. This security feature is of MMR 702 helps discover and prevent other readers from stealing or intercepting any communications between MMR 702 and other mobile devices (e.g., mobile device 918).

In one embodiment, MMR assembly 702 will include a unique serial number, stored in controller 836 or a memory of MMR 702 (not shown). When MMR assembly 702 is powered on, controller 836 will transmit the unique serial number to control panel 104 or to an external server or facility (e.g., MMR monitoring facility 914 or MMR monitor 910 described below) coupled to network 906. If the controller panel 104 or external server or facility determines the serial not does not match a stored serial number for the MMR 702, control panel 104 and/or the external server or facility will issue an alert signal to a relevant entity. In this way, if an attempt is made to replace MMR assembly 702 with another MMR assembly while MMR assembly 702 is powered off, control panel 104 and/or the external server or facility will be able to determine that a swap has taken place and can discontinue communication with the unauthorized MMR and send an alert to alarm monitoring central station 106 or another entity.

In some embodiments, MMR 702 may be part of a system configured to interface with one or more servers, POS terminals, ATMs, vending machines and/or mobile devices to provide a secure, convenient, and efficient means of transferring information between one or more entities as needed in various transactions in accordance with the present disclose. One such system is system 900 described with respect to FIGS. 13B, D, and E below.

As will be described below, the system advantageously separates any user credentials (e.g., passwords, credit/debit card information, etc.) or other sensitive transaction or access data amongst various different locations within the system and only assembles the credentials when necessary for use. After a user credential has been used to complete a transaction or gain access to a facility, the credential is deleted. In this way, a user's sensitive information (e.g., user credentials) cannot be stolen simply by gaining access to a single device. Also, the system is configured to transfer a transaction from a transaction terminal (e.g., an ATM, a retail checkout machine or system, etc.) to a mobile device 918 in communication with the MMR 702, where the transaction is completed using the mobile device 918. It is to be appreciated that, in some embodiments, when the transaction has been transferred to the mobile device, the transaction terminal is no longer needed to complete the transaction. In this way, the system makes it much more difficult to steal user credentials or other private data by installing skimming devices or hacking transaction terminals and/or transaction systems (e.g., POS systems).

Figure 13B:
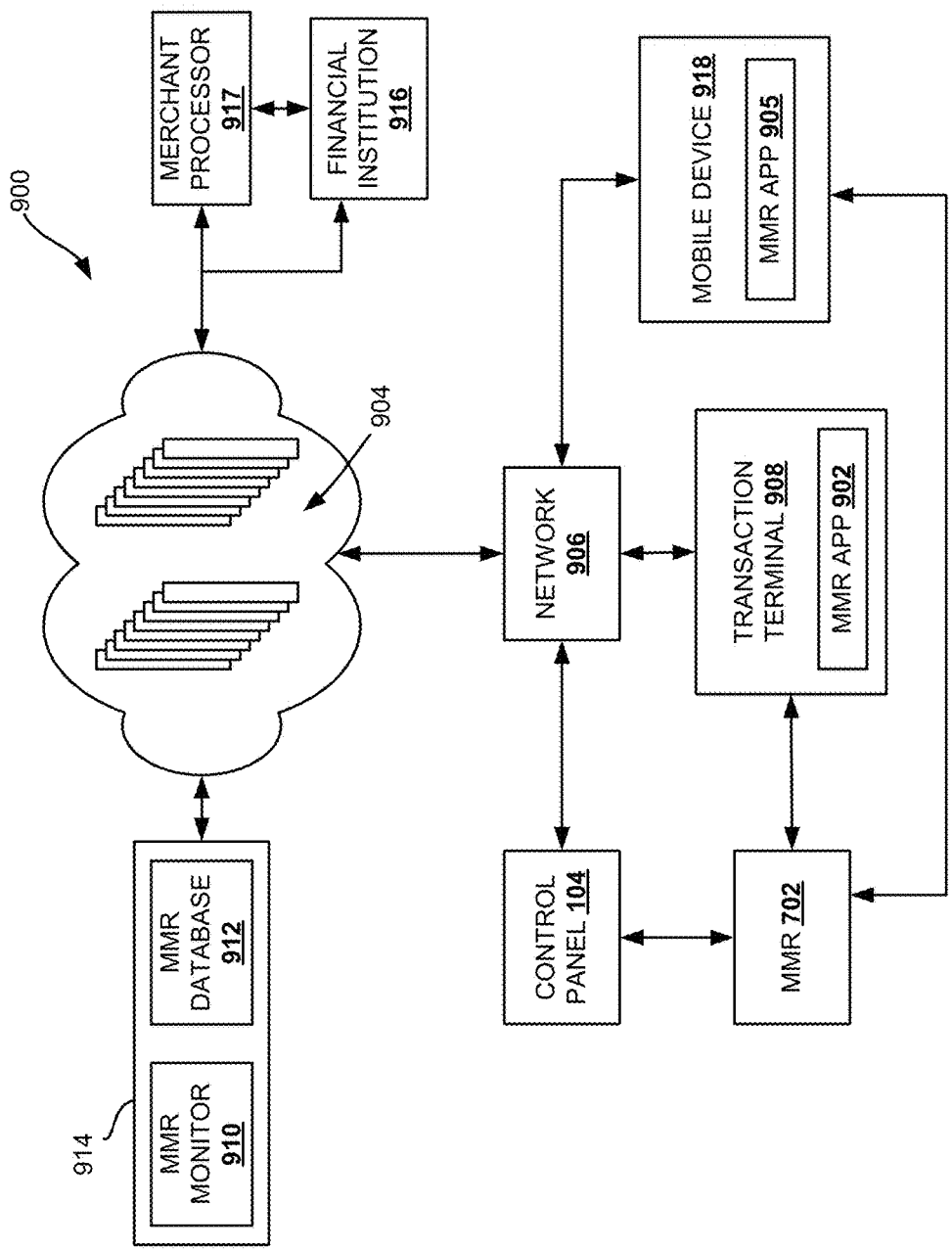
FIG. 13B is a block diagram of a transaction protection system in accordance with an embodiment of the present disclosure.

For example, referring to FIG. 13B, a system 900 including MMR 702 is shown in accordance with an embodiment of the present disclosure. As shown in FIG. 13B, in one embodiment, system 900 includes control panel 104, MMR 702, servers 904, network 906, transaction terminal 908, MMR monitoring facility 914, financial institution or card issuer bank 916, merchant processor 917, and mobile device 918. Each of control panel 104, MMR 702, servers 904, transaction terminal 908, MMR facility 914, merchant processor, financial processor 916, and mobile device 918 are coupled to network 906. It is to be appreciated network 906 may be any network(s) used to communicate information between devices and/or software components of system 900. Network 906 may represent more than one network (e.g., a first network and separate second network). For example, network 900 may be a local area network (LAN), wide area network (WAN), the Internet, one or more cellular or mobile networks, a satellite network, a wireless (e.g., WiFi) network, and/or a wired network.

As shown in FIG. 13B, MMR 702 is coupled to transaction terminal 908. Transaction terminal 908 may be any one of a POS terminal, an ATM, a self-service station, access equipment (e.g., a lock to an entryway for facility) or any other equipment requiring a user's personal credentials to complete a transaction. As stated above, MMR 702 is configured to read various media for storing a user's personal credential's (e.g., magnetic stripe cards, EMV cards, and/or phone with short range wireless communication capabilities, such as NFC, RFID, and/or BLE). In one embodiment, MMR 702 is used in system 900 to facilitate a secure and seamless communication session between a mobile device 918 (e.g., a smart phone, smart watch, or other device with short range wireless communication capabilities), a transaction terminal 908 (e.g., a POS terminal, ATM, etc.), and one or more network connected entities (e.g., MMR facility 914, servers 904, merchant processor 917, and/or financial institution 916).

In one embodiment, each of transaction terminal 908 and mobile device 918 includes an MMR application or software configured to facilitate communication between transaction terminal 908, mobile device 918, and MMR 702, and one or more network connected entities (servers 904, etc.) As shown in FIG. 13B, transaction terminal 908 includes MMR transaction terminal interface application 905 and mobile device MMR mobile application 902.

Figure 13C:
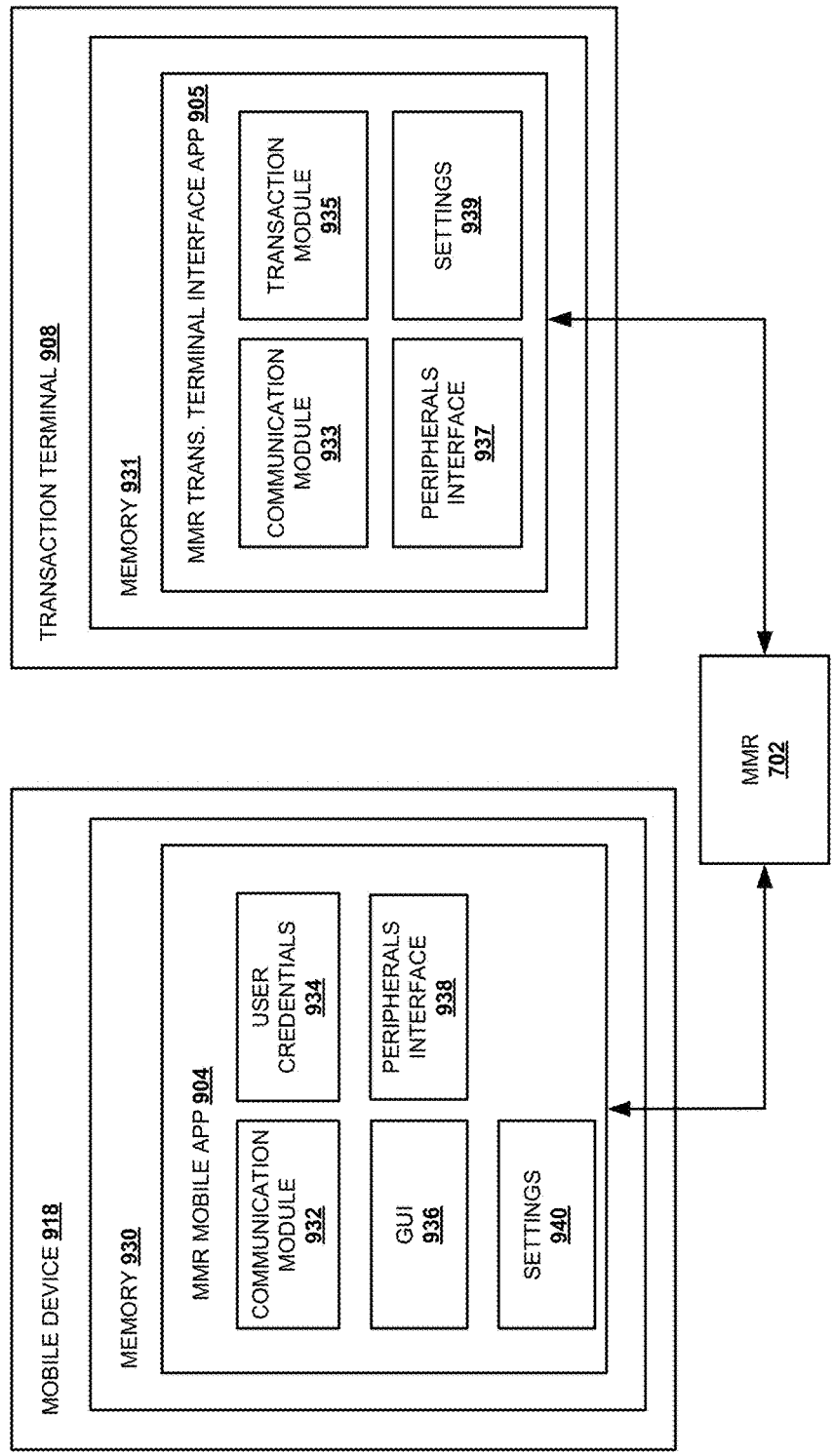
FIG. 13C includes a block diagram of an MMR mobile application and a block diagram of an MMR transaction terminal interface application in accordance with an embodiment of the present disclosure.

Referring to FIG. 13C, a block diagram of MMR mobile application 902 and a block diagram of MMR transaction terminal interface application 905 is shown in accordance with an embodiment of the present disclosure. As shown in FIG. 13C, MMR application 902 may be installed on a memory of a mobile device 918. MMR application 902 includes a communication module 932, user credentials module 934, graphical user interface (GUI) module 936, a peripherals interface 938, and a settings module 940.

Communication module 932 included in MMR application 902 is configured to use the communication capabilities of the device that MMR application 902 is installed on (e.g., mobile device 918, etc.) to send and receive information over network 906 as needed. For example, MMR application 902 may use the cellular, data, GPS, WiFi, RFID/NFC, and/or Bluetooth antennas of mobile device 918 to send and receive information as needed over the course of a transaction or communication session occurring in system 900. As will be described below, communication module 932 is configured to employ one or more security measures to ensure that any sensitive user data (e.g., credit card information, etc.) exchanged during a transaction is protected from various forms of cyber theft.

User credentials module 934 is configured to store one or more user credentials for use in a transaction or communication session. For example, in one embodiment, user credentials module 934 may store information associated with debit/credit cards, driver's licenses, passports, green cards, corporate IDs, loyalty cards, coupon information or any other information that may be used in a transaction under various circumstances. MMR application 902 may use the credentials stored in module 934 to complete one or more transactions as will be described in greater detail below. In one embodiment, MMR application 902 is configured to only store a portion of each user credential in module 934. In this embodiment, the remaining portion of each user credential is stored in one or more servers 904 to increase security, as will be described in greater detail below.

GUI module 936 is configured to use a processor of the device that MMR application 902 is installed on (e.g., a processor of mobile device 918 etc.) to generate a GUI usable by a user to interface with MMR application 902. It is to be appreciated that GUI 936 is configured to use a display of mobile device 918 to output the GUI generated by GUI 936 for display.

Peripherals interface 938 is configured to make use of the peripherals of mobile device 918 to collect data to be used in a transaction or communication session. For example, when MMR application 902 is installed on a smart phone 918, peripherals interface 938 is configured to use one or more of the peripherals of the smart phone 918, e.g., GPS, fingerprint scanner, front and/or rear cameras, etc., to collect data. Peripherals interface 938 may be used to collect any type of information required for a transaction. For example, peripherals interface 938 may be used to collect authentication information, such as, a fingerprint of a user using the fingerprint scanner of a smart phone 918.

Settings module 940 is configured to store one or more settings associated with MMR application 902.

Also shown in FIG. 13C, is MMR transaction terminal interface application 905, where MMR application 905 may be stored in a memory of a transaction terminal (e.g., a POS terminal, ATM, self-service machine, etc.). MMR application 905 includes communication module 933, transaction module 935, peripherals interface 937, and setting 939.

Communication module 933 is configured to use any of the communication capabilities of the transaction terminal 908 MMR app 905 is installed on to send and receive communication over network(s) 906. For example, if transaction terminal 908 is coupled to network(s) 906 via a hardwired or wireless connection, communication module 933 is configured to use the hardwired or wireless connection to send and receive information. As will be described below, communication module 933 is configured to employ one or more security measures to ensure that any sensitive user data (e.g., credit card information, etc.) exchanged during a transaction is protected from various forms of cyber theft.

Transaction module 935 is configured to collect any information associated with a transaction that is occurring during a communication session. For example, if terminal 908 is a retail register, transaction module 935 is configured to collect information associated with what items have been scanned. Furthermore, transaction module 935 is configured to collect any user credentials presented in connection with a transaction. For example, transaction module 935 may collect a user's credit card information or an identification number or any other type of user credential needed to complete a transaction. It is to be appreciated the user credential information may be received (via communication module 933 and network 906) from MMR 702, MMR mobile application 902, servers 904, merchant processor 917, and/or financial institution 916. Transaction module 935 may then share this information with MMR application 940 via communication module 933 or with one or more servers 904, merchant processors 917, and/or financial institutions 916 to complete a transaction or other devices on network(s) 906.

Peripherals interface 937 is configured to interface with the peripherals of transaction terminal 908 to collect any necessary information associated with a transaction that is occurring. For example, peripherals interface 937 may interface with a QRcode or barcode scanner of a POS terminal 908 to collect information associated with the items scanned during a purchase using terminal 908. Peripherals interface 937 may then share this information with transaction module 935.

Settings module 939 is configured to store one or more settings associated with MMR application 905.

Referring again to FIG. 13B, MMR facility 914 may include an MMR monitor 910 configured to monitor one or more MMRs 702 and any transactions occurring on system 900 from a remote location over network 906. For example, MMR monitor 910 may be in communication with controller 836 of MMR 702 to monitor tamper switch 733, accelerometer 802, and/or NFC chipset 806 to provide security services for MMR 702. MMR monitor 910 may further communicate and request a unique serial number (as described above) of MMR 702 to ensure MMR 702 has not been replaced with an impersonating MMR. MMR monitor 910 may further be in communication with MMR applications 904 and 905 to monitor any activities associated with applications 904 and 905 and store or configure any settings in settings modules 939 and 940. MMR facility 914 may further include MMR database 912 (e.g., an SQL database). Database 912 may store any unique serial numbers associated with MMRs 702 within system 900, encryption keys used for encrypted communication in system 900, and any other security information required to maintain and monitor system 900. It is to be appreciated that, in some embodiments, controller 104 is configured to perform the same tasks as MMR monitor 910 and/or database 912 locally (i.e., over the same local or hardwired network as MMR 702) to provide the security measures of MMR monitor 910 and/or database 912 when network 906 is not available to device 918 and/or MMR 702.

Figure 14:
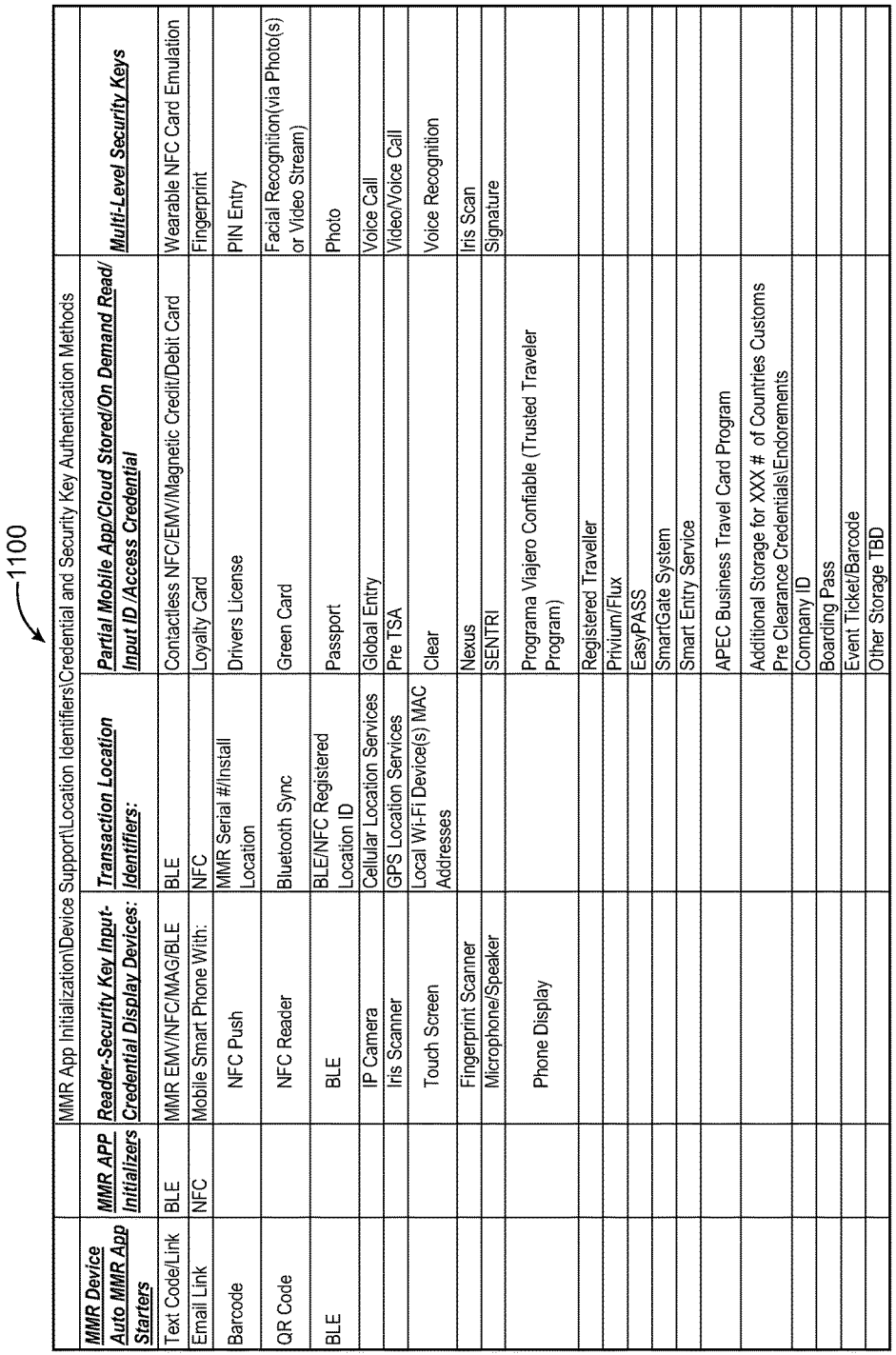
FIG. 14 is a feature matrix in accordance with an embodiment of the present disclosure.

In one embodiment, when a mobile device 918 including MMR application 902 is placed in close proximity to MMR 702, thus triggering Bluetooth module 805 (e.g., a Bluetooth chipset) and/or NFC chipset 806, MMR application 902 is configured to be auto launched. In this embodiment, controller 836 of MMR 702 is configured to use NFC chipset 806 and Bluetooth module 805 (e.g., a Bluetooth pairing module) to periodically and continuously scan for NFC and/or BLE enabled mobile devices 918. If an NFC and/or BLE enabled device is detected by controller 836, a signal and/or request is sent to communication module 932 of MMR application 902 from MMR 702 to auto launched MMR mobile application 902. It is to be appreciated that MMR application 902 may also be manually started by a user to initiate a communication session between a mobile device 918 including MMR application 902 and an MMR 702. Referring to FIG. 14 a matrix 1100 including a variety of supported features for system 900 and MMR 702 is shown in accordance with the present disclosure. Under the section "MMR App Initializers" BLE and NFC are included as two ways that the MMR application can be automatically launched.

Also included in matrix 1100, is a column titled "MMR Device Auto MMR App Starters." In this column of matrix 1100, a list of methods to automatically install (or automatically prompt to install) MMR application 902 on a phone is described. For example, MMR application 902 may be installed on a mobile device that has BLE communications enabled and comes within range (e.g., within 30 meters) of the communication capabilities of BLE chipset 805 of MMR 702. In this embodiment, MMR 702 is configured to sense an BLE enabled device (i.e., mobile device 918) and push or send a request to the BLE enabled device 918 to download MMR application 902. In one embodiment, the app store of the operating system being used by the BLE enabled device 918 (e.g., iOS, Android, Blackberry, Windows Phone OS, etc.), is auto launched on the BLE enabled device 918 and displayed on a display of device 918 with a prompt to install MMR application 902.

In another embodiment, MMR 702 is configured to sense an NFC/RFID enabled device 918 that comes within NFC range (e.g., within 5 centimeters) of MMR 702 (i.e., within 5 centimeters of surface 793 of MMR 702. In this embodiment, controller 836 is configured to send (via NFC chipset 806 and antenna 706) a request to the detected NFC enabled device 918 to auto launch the app store of the device 918 to install MMR application 902.

In another embodiment, communication module 807 of MMR 702 may continuously send requests over a WiFi network for a WiFi connected mobile device 918 to install MMR application 902. The request may be an email or push notification sent to the mobile device 918 connected to the same WiFi network as MMR 702.

In another embodiment, communication module 807 of MMR 702 may send an SMS message over a cellular network 906 to a mobile device 918 instructing the mobile device 918 to install MMR application 902. The SMS message may include a link that, when selected within the SMS message, auto launches the app store of the mobile device 918 to install MMR application 902.

In another embodiment, MMR 702 may include a barcode, QR code, or NFC tag disposed on the exterior of housing 714 of MMR 702 or in a location proximate to MMR 702. If a mobile device 918 uses its peripherals to scan or read the data associated with the barcode, QR code, or NFC tag, the app store of the mobile device 918 will be auto launched to install MMR application 902.

Also shown in FIG. 14, under the column titled "Reader-Security Key Input-Credential Display Devices", is the various methods of obtaining a security key (e.g., a fingerprint or iris scan used for authentication) and/or a credential (e.g., a password or debit/credit card number) from a user. For example, a smartphone 918 may include an NFC push/ reader, BLE, camera (e.g., an IP camera) Iris scanner, touch screen, fingerprint scanner, microphone/speaker, and/or phone display, which are all capable of receiving user related information, such as, security keys and/or user credentials. MMR 702 includes a plurality of ways of receiving security and/or credential information obtained from a user using mobile device 918, including, but not limited to, antenna 706/NFC chipset 806 to receive NFC signals from mobile device 918, magnetic stripe reader 766 to reader magnetic stripe information (e.g., when a smart card is used instead of mobile device 918), and/or Bluetooth module 805 to receive Bluetooth communication from mobile device 918.

The "Multi-Level Security Keys" column of matrix 1100 shows various security keys that can be used to authenticate a transaction. For example, a wearable NFC card (e.g., a smart card, EMV card, and/or a smart watch) may be used to authenticate a transaction. It is to be appreciated that even if mobile device 918 is used to facilitate a transaction, a wearable NFC card may be used in addition to mobile device 918 to authenticate a transaction. Other security keys included in column "Multi-Level Security Keys" include a fingerprint (obtained via a fingerprint sensor of mobile device 918), PIN entry (obtained via the touch screen of mobile device 918), facial recognition (via photos and/or video obtained from a camera of mobile device 918), a voice call (e.g., a call to mobile device 918 to speak to a user), voice recognition (via a microphone of device 918), an iris scan (via an iris scanner of device 918), and a signature (obtained via the touch display of device 918).

The "Transaction Location Identifiers" column of matrix 1100 shows location information that may be used to authenticate the location a transaction taking place in system 900. In other words, in some embodiments, an additional security that may be taken in a transaction, is to determine the location that a transaction is taking place. For example, a mobile device 918 may be placed in close proximity to MMR 702 and BLE and/or NFC communication between mobile device 918 and MMR 702 may be used to determine that a mobile device 918 of a user is in a particular location (i.e., the fixed, known location where MMR 702 is). The unique serial number of the MMR 702 may be shared with MMR application 902 and/or with another entity within system 900 to validate the location that a transaction is taking place (i.e., the fixed, known location where MMR 702 is). The cellular and/or GPS location services of mobile device 918 may be used by MMR application 902 to determine the location of mobile device 918 during a transaction. Additionally, the MAC addresses of devices on a location WiFi network and/or information associated with the local WiFi network itself may be used to identify and validate the location of mobile device 918. It is to be appreciated that MMR application 902 may use the peripherals of mobile device 918 to determine the WiFi information described above.

The "Partial Mobile App/Cloud Stored/On Demand Read/ Input ID/Access Credential" column of matrix 110 includes a non-exhaustive lists of the user credential's that may be at least partially (for security reasons described below) stored in user credentials module 932 of MMR application 902. For example, the user credentials may include, but are not limited to, NFC/EMV/Magnetic credit/debit card information, loyalty card information, driver's license information, green card/passport information, company ID, boarding pass (e.g., for an air plane ticket), event ticket/barcode (e.g., for a concert), etc.

As stated above, MMR 702 is used in system 900 in the context of many different types of transactions requiring the exchange of user credentials. For example, in one embodiment, MMR 702 may be used in the context of the retail sale of goods. Referring again to FIG. 13B, a mobile device 918 may be waved in front of MMR 702 to initiate a communication session between a POS terminal 908, mobile device 918, and MMR 702. As items are scanned by POS terminal 908, communication module 933 may obtain transaction information from transaction module 935 and peripherals interface 937 to transmit or stream the details of the transaction in real-time to MMR application 902. For example, as each item is scanned by POS terminal 908, communication module 932 of MMR application 902 may receive information associated with each scanned item (price, graphics, product description, number of items, etc.) and present the information on a display of mobile device 918 via a GUI generated by GUI 936. The transaction information streamed by MMR app 905 to MMR application 902 may be streamed via network 906. It is to be appreciated that if network 906 is unavailable for any reason, MMR application 905 may send the information to MMR 702 (e.g., via a hardwired connection to MMR 702) and MMR 702 may stream the information to MMR application 902 via NFC chipset 806 and antenna 706 and/or Bluetooth module 805.

When all of the items have been scanned by POS terminal 908, MMR application 905 may send a message to MMR application 902 indicating all items have been scanned and that the user must select a payment method. MMR application 902 may then allow the user to present a user credential (e.g., a credit card) to MMR 702 by waving the mobile device 918 in front of MMR 702, where MMR 702 may receive the user credential via NFC communication with the mobile device 918. The user credential (e.g., credit card information) may either be provided by MMR 702 to transaction terminal 908, where transaction terminal 908 may then provide the user credential to merchant processor 917 and card issuer 916 for approval, or MMR 702 may provide the user credential directly (i.e., without first sending the user credential to transaction terminal 908) to merchant processor 917 and card issuer 916. The merchant processor 917 and card issuer 916 may then verify the user credential (i.e., check the credit card information) and transfer money from the user's account to the merchant's account and return an approval code to MRR 702, mobile device 918, and/or transaction terminal 908 via network 906 to complete the transaction.

Figure 13D:
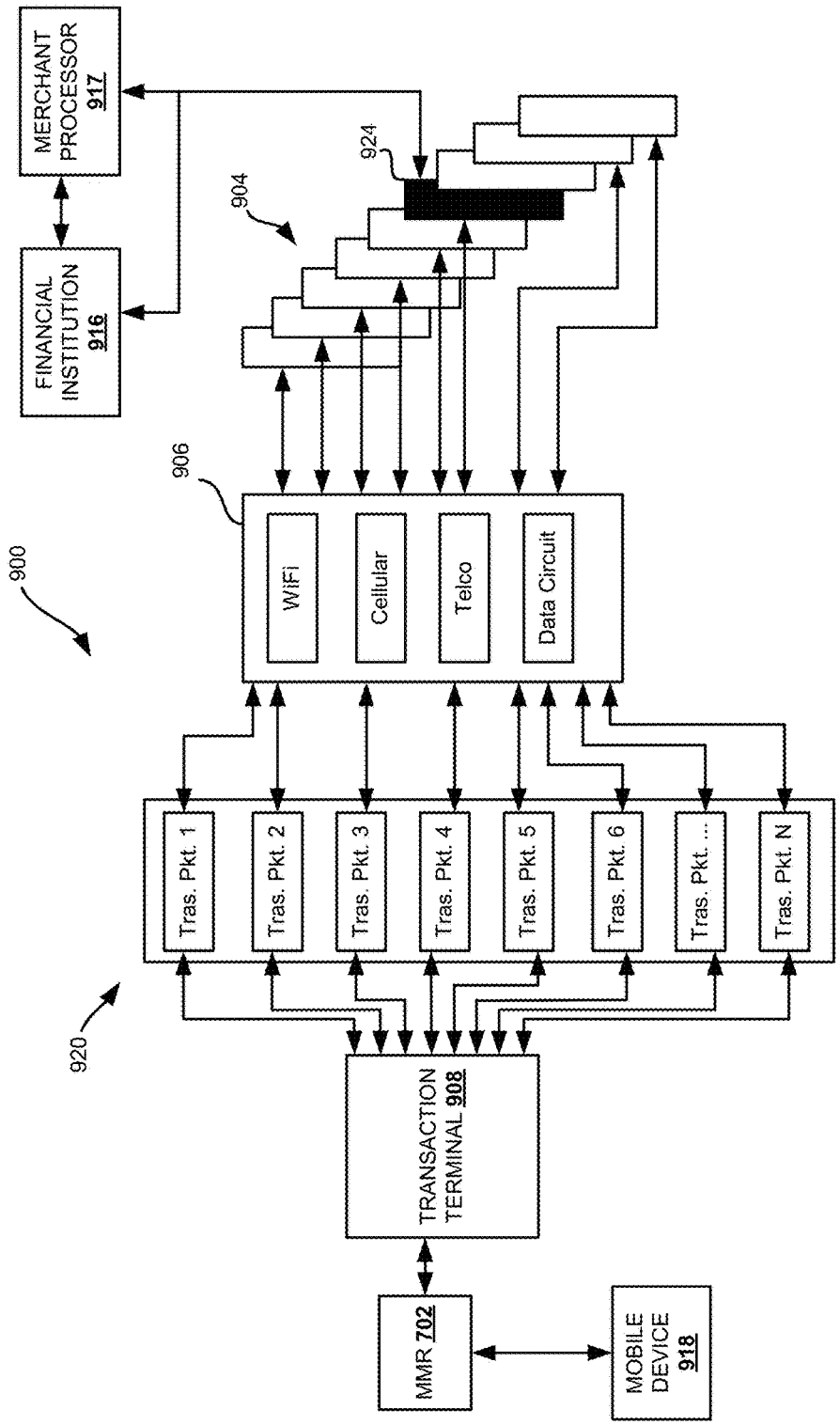
FIG. 13D is another block diagram of the transaction protection system of FIG. 13B a card protection system in accordance with an embodiment of the present disclosure.

It is to be appreciated the communication modules 933, 805, and servers 904 may be configured to employ one or more security measures in sharing or transmitting a user's credential stored within user credential module 934 of MMR application 902 to merchant processor 917 and financial institution 916. For example, referring to FIG. 13D another block diagram of system 900 is shown in accordance with the present disclosure. As shown in FIG. 13D, in one embodiment, when communication module 933 of transaction terminal 908 receives a user credential and any other sensitive transaction information, communication module 933 is configured to separate the transaction information (including the user credential) 920 into a plurality of separate packets. It is to be appreciated that the transaction information 920 may be separated into any number of packets. The separate packets are then sent via network 906 to a plurality of server 904. It is to be appreciated that servers 904 may be virtual and/or dedicated servers within a server farm that is located in a remote location to where the transaction is taking place (i.e., the location of MMR 702 and transaction terminal 908).

As shown in FIG. 13D, the transaction packets may be sent via more than one network 906 (e.g., some may be sent via the Cellular network and others may be sent via WiFi or Telco, etc.) to servers 904. It is to be appreciated that each of the transaction packets may be encrypted by communication module 933 using an encryption key (maintained by MMR facility 914 and stored in MMR applications 904 and 905). Also, it is to be appreciated that the transaction packets may be sent by communication module 933 of terminal 908 to random servers within server farm 904. In some embodiments, each time transaction information 920 is sent via network 906 to servers 904, communication module 933 is configured to send the transaction packets to a different combination of servers within server farm 904.

The encrypted packets are received by at least some of the servers in server farm 904 and each receiving server decrypts the corresponding received transaction packet. One receiving server, for example, server 924 in FIG. 13D, is assigned the task reassembling or rebuilding the separated packets. In some embodiments, the rebuilding server 924 is the first server of the servers that receives one of the transaction packets associated with a user credential 920 to announce to the other servers that a transaction packet has been received. In response to this announcement to the other servers in server farm 904 that a transaction packet has been received, each subsequent server that receives a transaction packet sends the received subsequent transaction packet to rebuilding server 924. In other words, the first server to receive a transaction packet broadcasts to all servers that they are the rebuild server, and then all other server (i.e., the servers that are not rebuild servers) forward the remaining packets to the rebuild server for reassembly by the rebuild server. In one embodiment, each transaction packet includes a header identifying an identification number associated with the terminal 908 and a date and time of the transaction.

Once rebuilding server 924 receives all of the transaction packets, rebuilding server 924 reassembles or rebuilds the original user credential and provides the user credential to card issuer 916 and/or merchant processor 917. Card issuer 916 then checks the user credential (e.g., credit card information) that was originally provided to MMR 702 by mobile device 918 and/or a card used by the user to ensure the user credential provided is accurate and there are no restrictions associated with the transaction (i.e., a hold on the account, a limit reached, insufficient funds, etc.) based on the transaction information received by rebuild server 924. A signal or communication indicating an approval or denial of the transaction is then sent from card issuer 916 to merchant processor 917 and to transaction terminal 908 and mobile device 918. Alternatively, the approval/denial communication may be sent from the card issuer 916 back to the rebuilding server 924, where the rebuilding server 924 sends the approval/denial communication to merchant processor 917, transaction terminal 908, and mobile device 918.

Figure 13E:
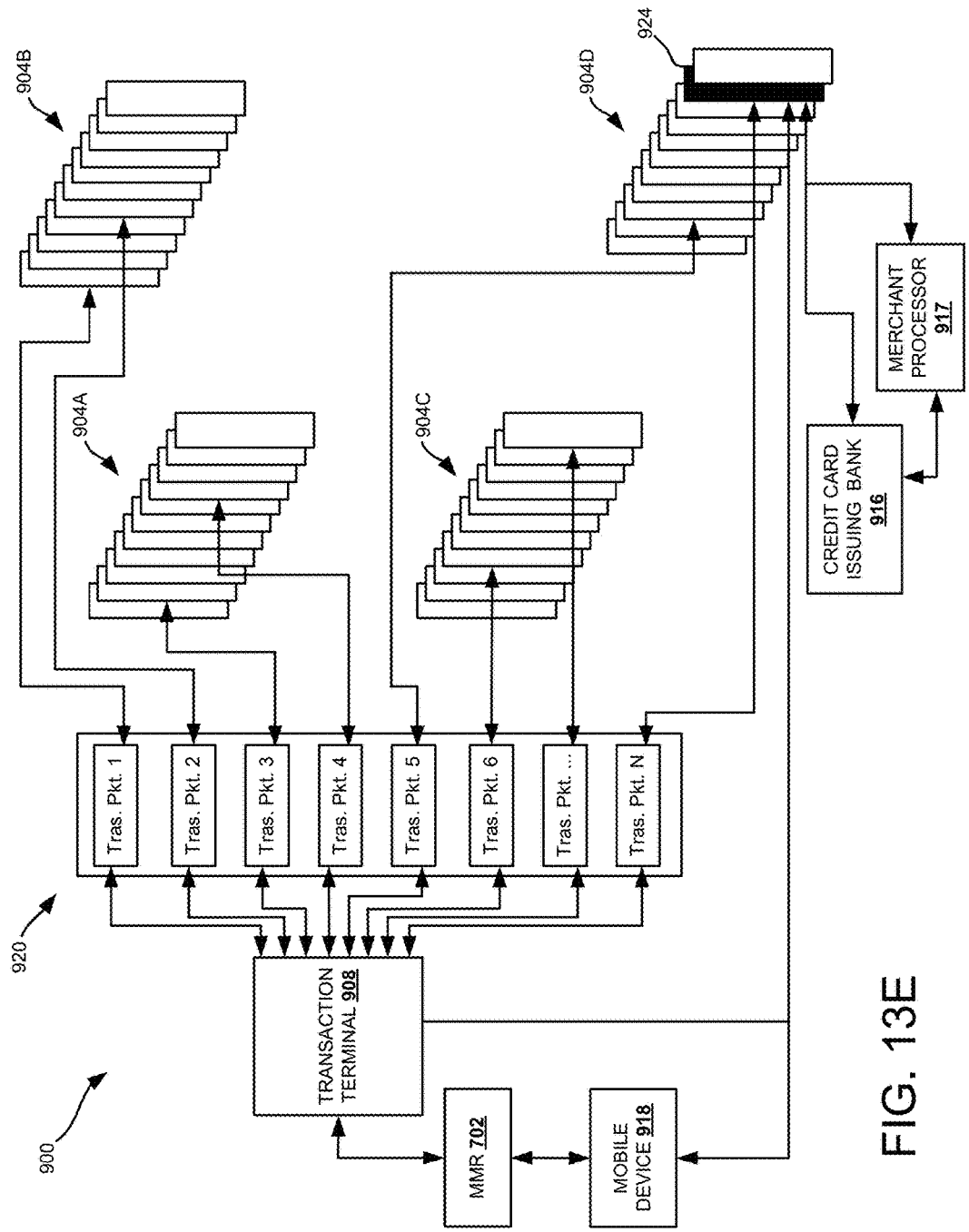
FIG. 13E is another block diagram of the transaction protection system of FIG. 13B in accordance with an embodiment of the present disclosure.

Referring to FIG. 13E, in another embodiment, communication module 933 of transaction terminal 908 is configured to send the separated transaction packets of a transaction 920 to a plurality of remote server farms 904A, B, C, and D, that are each located remotely to each other to further increase security. Within each of the server farms 904, communication module 933 is configured to send each transaction packet to a random server. As described above, the first server to receive a transaction packet of the plurality of transaction packets of transaction 920 is the rebuild server. The rebuild server 924 then broadcasts to all other server to send the rebuild server 924 the remaining transaction packets, where the rebuild server will rebuild the original transaction information 920 once rebuild server 924 receives the remaining transaction packets from the other servers.

It is to be appreciated that communication modules 932 and 805 of MMR application 902 and MMR 702, respectively, may each be configured to send transaction information 920 to a desired entity (e.g., card issuer 916 and/or merchant processor 917) over network 906 in the manner described above in relation to FIGS. 13D and E (i.e., by separating the transaction information 920 into a plurality of separate packets and sending each of the plurality of separate packets to a random server 904 of a plurality of servers).

It is to be appreciated that the merchant, user, and/or credit issuer may require one or more security measures to be taken in connection with a transaction, other than the presentation of a user credential. For example, a location verification may be required in some embodiments. In these embodiments, the location of the MMR 702 and/or a user's mobile device may be verified and provided to the card issuer 916 to ensure that the mobile device is present at the location of the transaction at the time the transaction is taking place.

As described above, this location information may be obtained by MMR application 902 and/or MMR 702 in any number of ways (e.g., GPS/Cellular data from mobile device 918, communication link between device 918 and MMR 702, etc.) If, based on the location identification data provided by MMR application 902 to card issuer 916, card issuer 916 determines that the distance of the device 918 relative to MMR 702 is questionable, the transaction may be denied or the card issuer 916 may request additional security keys may be provided. For example, the user may be prompted by MMR application 902 to provide a finger print via a finger print scanner of device 918 or any other security key (e.g., a pin number, phone call, etc.) In some embodiments, multiple security keys and/or points of authentication are required for certain transactions. The security key and/or location identification requirements of each transaction may be saved in the settings modules of MMR applications 904/905 for each user as desired.

It is to be appreciated that although the embodiments described above in relation to FIGS. 13B-E were described in relation to a POS scenario (i.e., purchasing goods). The system 900 described above, is equally applicable to any type of transaction involving the exchange of private data. For example, the techniques for separating and reassembly communications throughout a network described above, may also be used to a means to gain access to a facility or event (e.g., through the gate of an airport by presenting a boarding pass stored in MMR application 902, into the venue of a concert by presenting a ticket stored in MMR application 902, etc.)

In addition to security measures for providing or sending a user credential or sensitive transaction information across network 906 to a relevant entity (e.g., card issuer 916), system 900 also employs security measures for storing user credentials in module 934 of MMR application 902. For example, in one embodiment, MMR application 902 is configured to only partially store each of the user's credentials (e.g., passwords, ID numbers, credit/debit cards, etc.) for use in a transaction. The remaining portions of each user credential are stored in one or more separate servers 904. In some embodiments, the servers that store the remaining portions of each user credential are different than the servers 904 used to send out transaction information 920.

When a particular user credential is needed to complete a transaction, communication module 932 or MMR application 902 is configured to request the remaining portions of the credential from one or more servers 904 coupled to network 906. After receiving each of the remaining portions of the requested credential, communication module 932 and/or user credentials module 934 are configured to reassemble or rebuild the requested credential for use in a transaction. After the credential is used in the transaction, the portions of the requested credential that were received by communication module 932 of MMR application 902 are destroyed or erased from user credentials 934 of MMR application 902 and only the original portion of the requested credential is maintained in user credentials 934 of MMR application 902.

In one embodiment, when a transaction is initiated by waving a mobile device 918 in front of an MMR 702, the transaction may be transferred from transaction terminal 908 to MMR application 902 of mobile device 918, where the transaction can be completed. In this way, when the transaction is transferred from transaction terminal 908 to MMR application 902, POS terminal 908 will no longer be used in the transaction. For example, in one embodiment, MMR 702 may be coupled to an ATM or self-service machine 908. Once a user waves their mobile device 918 in front of MMR 702 (and MMR 702 detects the mobile device via NFC/BLE communication), the MMR app 905 of ATM or self-service machine 908 may transfer the remaining transaction to MMR 904 to be completed on the mobile device 918. From this point forward in this transaction, the mobile device 918 and the MMR 702 are all that is needed to complete the transaction, since mobile device 918 has access to user credentials and security keys (as described above) and can communicate these keys security to relevant entities over network 906 via MMR 702 (e.g., via NFC/BLE communication with MMR 702 or magnetic stripe reader 722).

In one embodiment, MMR 702 may replace transaction terminal 908 completely. The combination of MMR 702 and mobile device 918 may be used to complete the entire transaction from start to finish. In this embodiment, the camera of mobile device 918 camera may be used to scan items for purchase, the display of mobile device may be used to present boarding passing or other tickets, and the communication session between MMR 702 and MMR application 902 may be used to communication any security keys or user credentials needed to complete the transaction between device 918, MMR 702 and any entities coupled to network 906 that are needed to authorize the transaction (i.e., card issuer 916, merchant 917, an entity providing access to a facility, etc.)

In another embodiment, the MMR application 902 can be used to provide a $2^{nd}$ level of identification to display or share credential data. The MMR application 902 provides various method of verifying the validity of a credential via third party applications interfaced with the MMR application 902 and the MMR server 904. For example, in one embodiment, the MMR application 902 can send a text message or an email containing a verification code to a user's mobile device after a user attempts to use the MMR assembly 702. The user can then be prompted to enter the security code into the MMR application 902 as a second level of authentication.

Figure 15:
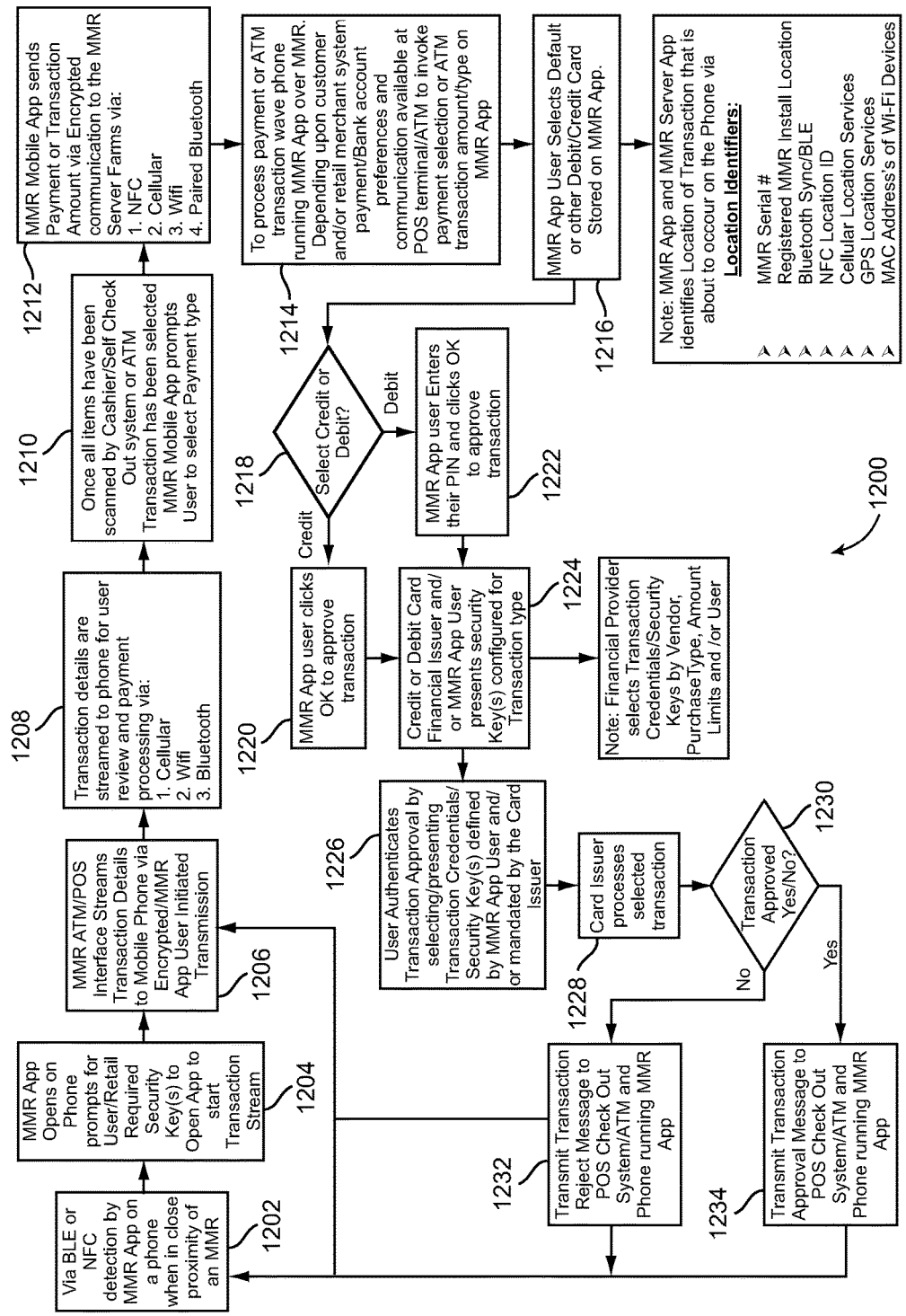
FIG. 15 is a flowchart of a method in accordance with an embodiment of the present disclosure.

Referring to FIG. 15, a method 1200 is shown in accordance with the present disclosure. Initially, in step 1202, MMR application 902 is auto-launched via BLE or NFC detection of a mobile device 918 by antenna 706/NFC chipset 806 or BLE chipset 805, as described above. The MMR application 902 may then open on a display of device 918 and prompts the user for one or more security keys (e.g., a pin, fingerprint, etc.) required by the retailer or other entity to start streaming the transaction to MMR application 902 from MMR application 905 of transaction terminal 908, in step 1204. Upon entering the required security keys, transaction module 935 and communication module 933 begin streaming the transaction (e.g., showing items being scanned, etc.) to MMR application 902, in step 1206. It is to be appreciated that communication module 933 encrypts the stream of the transaction details to prevent eavesdropping by unwanted devices. As stated above, the streaming may be achieved via network 906 (cellular, WiFi) and/or via the BLE link established between MMR 702 and device 918, in step 1208.

In step 1210, once all items have been scanned by the POS terminal 908 or ATM transaction has been selected, MMR application 902 is configured to prompt the user to select a payment type (e.g., credit, debit, loyalty, etc.). In step 1212, communication module 932 of MMR application 902 sends the payment or transaction amount (i.e., price of all items scanned) via an encrypted communication to servers 904. It is to be appreciated that this encrypted communication may be separated into a plurality of packets and sent to different servers as described above. Furthermore, it is to be appreciated that the encrypted communication may be sent via NFC (through MMR 702), cellular, WiFi, or paired Bluetooth connection through MMR 702).

In step 1214, to process the payment or ATM transaction, mobile device 918 is waved over MMR 702. Also, depending upon customer and/or retail merchant system payment/Bank account preferences (saved in settings modules 940/939 of MMR applications 904/905) and communication options at terminal 908, payment selection is invoked on MMR application 902. In step 1216, within MMR application 902, the user selects a saved payment method (e.g., a debit or credit card) at least partially stored within user credentials 934. It is to be appreciated that the MMR application 902 is configured to determine the location of the transaction taking place in a manner described above and included in matrix 1100.

If, in step 1216, credit was selected, the user selects "OK" within MMR application 902 to approve the transaction, in step 1220. If, in step 1216, debit was selected, the user is prompted to enter a PIN within the MMR application 902 associated with the debit card and selects "OK" within MMR application 902 to approve the transaction, in step 1222. In step 1226, any required security keys (i.e., fingerprint, iris scan, etc.) credential information (i.e., the debit/credit card information) required for the current transaction are presented via MMR application 902 to the card issuer 917. It is to be appreciated that this security key and user credential information is communicated to the card issuer 917 by separating the communication including the information and providing the separated communications to separate servers as described above in relation to FIGS. 13D and E.

In step 1230, it is determined by card issuer 917 if the transaction is approved or denied (i.e., based on the credentials and securities provided being authentic and valid as assessed by issuer 917 and any account holds and fund sufficiencies). If the transaction is denied, a rejection message is sent by the issuer 917 to the terminal 908 and MMR application 902, in step 1232. If the transaction is approved, an approval message is sent by the issuer 917 to the terminal 908 and MMR application 902, in step 1234.

Figure 16:
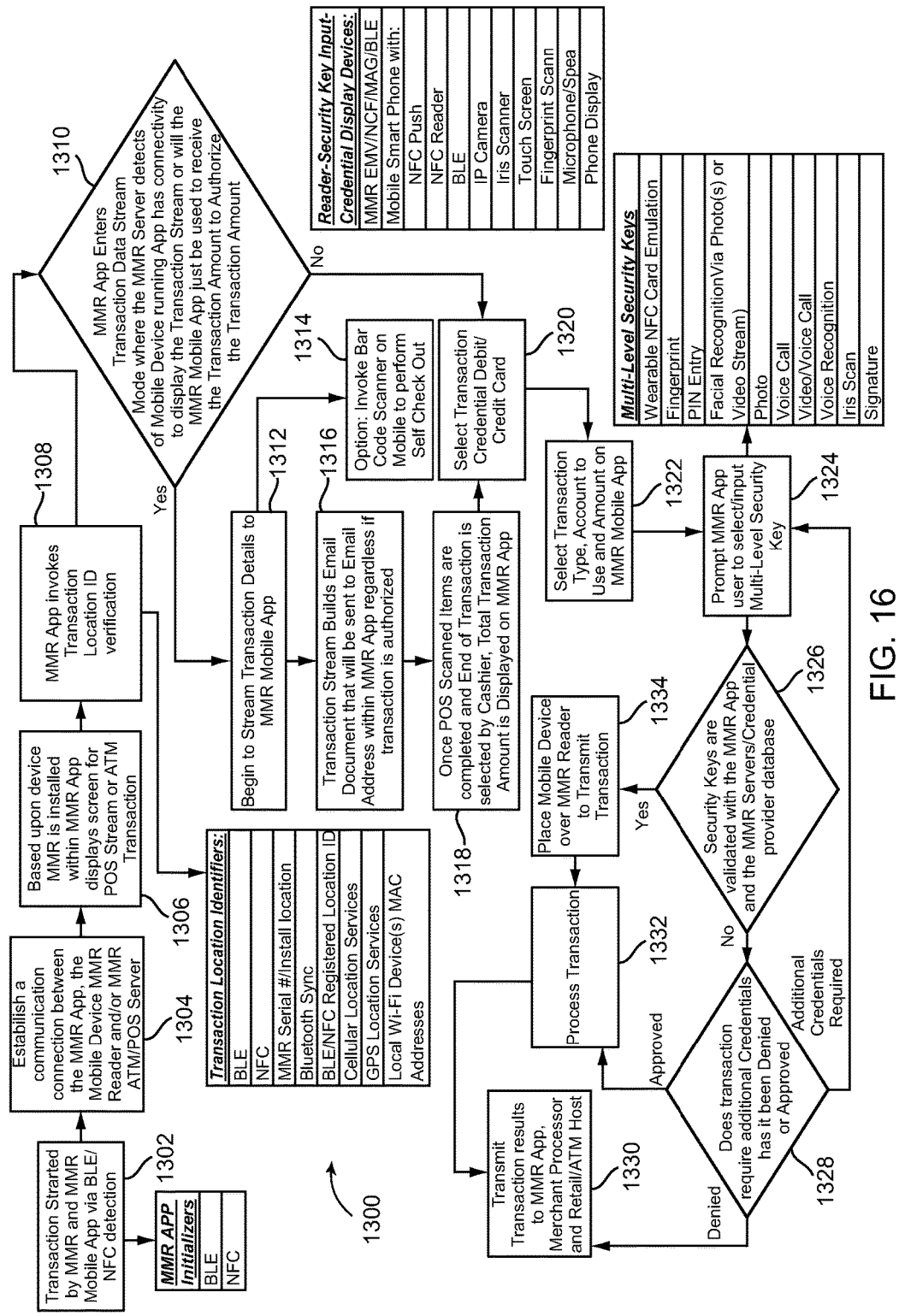
FIG. 16 is a flowchart of a method in accordance with an embodiment of the present disclosure.

Referring to FIG. 16, a method 1300 is shown in accordance with the present disclosure. In step 1302, a transaction is initiated by MRP application 902 and MMR 702 when MMR 702 detects NFC and/or BLE signals from a mobile device 918. In step 1304, a communication session is established between mobile device 918 (running MMR application 902), MMR 702, and transaction terminal 908 (running MMR app 905). In step 1306, MMR application 902 displays a screen (generated by GUI 936) for POS stream or ATM transaction (i.e., to stream the transaction occurring on terminal 908). In step 1308, the MMR application 902 invokes transaction location identification verification (based on the location identifiers described above).

In step 1310, the MMR application 902 determines, whether based on the current transaction type, the mobile device being used (i.e., whether device 918 includes a display), and user preferences saved in settings 940, whether to initiate a transaction streaming mode with MMR application 905. If it is determined that no transaction stream is to be initiated, in step 1310, the method proceeds to step 1320, where the MMR application 902 prompts the user to select a credential or payment method (i.e., credit or debit). If it is determined that transaction stream is to be initiated, in step 1310, MMR application 905 is instructed by MMR application 902 to begin streaming the transaction information in real-time to MMR application 902, in step 1312. In step 1314, if the mobile device 918 includes bar code scanning capabilities, the MMR application 902 provides an option to perform self checkout. In step 1316, MMR application 905 generates a message (e.g., an email document) to be sent to MMR application 902 regardless if transaction is authorized. The message contains all the transaction information (e.g., items scanned, etc.) Once all items have been scanned by terminal 908 (or by device 918), the end of the transaction is indicated by the cashier operating terminal 908 and a total amount owed (as aggregated by module 935 and sent to MMR application 902) for the scanned items is displayed on device 918 by MMR application 902, step 1318. Then the process proceeds to step 1320, described above.

In step 1322, the user selects the transaction type, account to use, and the amount to be paid within the MMR application 902. In step 1324, MMR application 902 prompts the user to select and input a multi-level security key. For example, as described above, the multi-level security key may be two or more forms of securities keys, including a wearable NFC card, fingerprint, PIN, facial recognition, etc. In step 1326, it is determined whether the security keys inputted in step 1324 are validated (based on a comparison to saved security keys in MMR application 902 and/or MMR database 912). If the security keys are not validated in step 1326, it is determined whether the transaction requires additional credentials or security keys (i.e., as a second chance) and whether those additional credentials or security keys are approved or denied, in step 1238. If the additional credential or security keys are approved in step 1328, the transaction is processed (i.e., funds are transferred between user's account and merchant's account) in step 1332, the transaction results (i.e., approval) are transmitted to the MMR application 902 by the merchant processor 917 and/or card issuer 916. If the additional credential or security keys are denied in step 1328, the transaction results (i.e., denial) are transmitted to the MMR application 902 by the merchant processor 917 and/or card issuer 916. If the security keys are validated in step 1326, the user is prompted by the MMR application 902 to place the device 918 over surface 973 of the MMR 702 to transmit the transaction, in step 1334, and the transaction is processed in step 1332.

Figure 17:
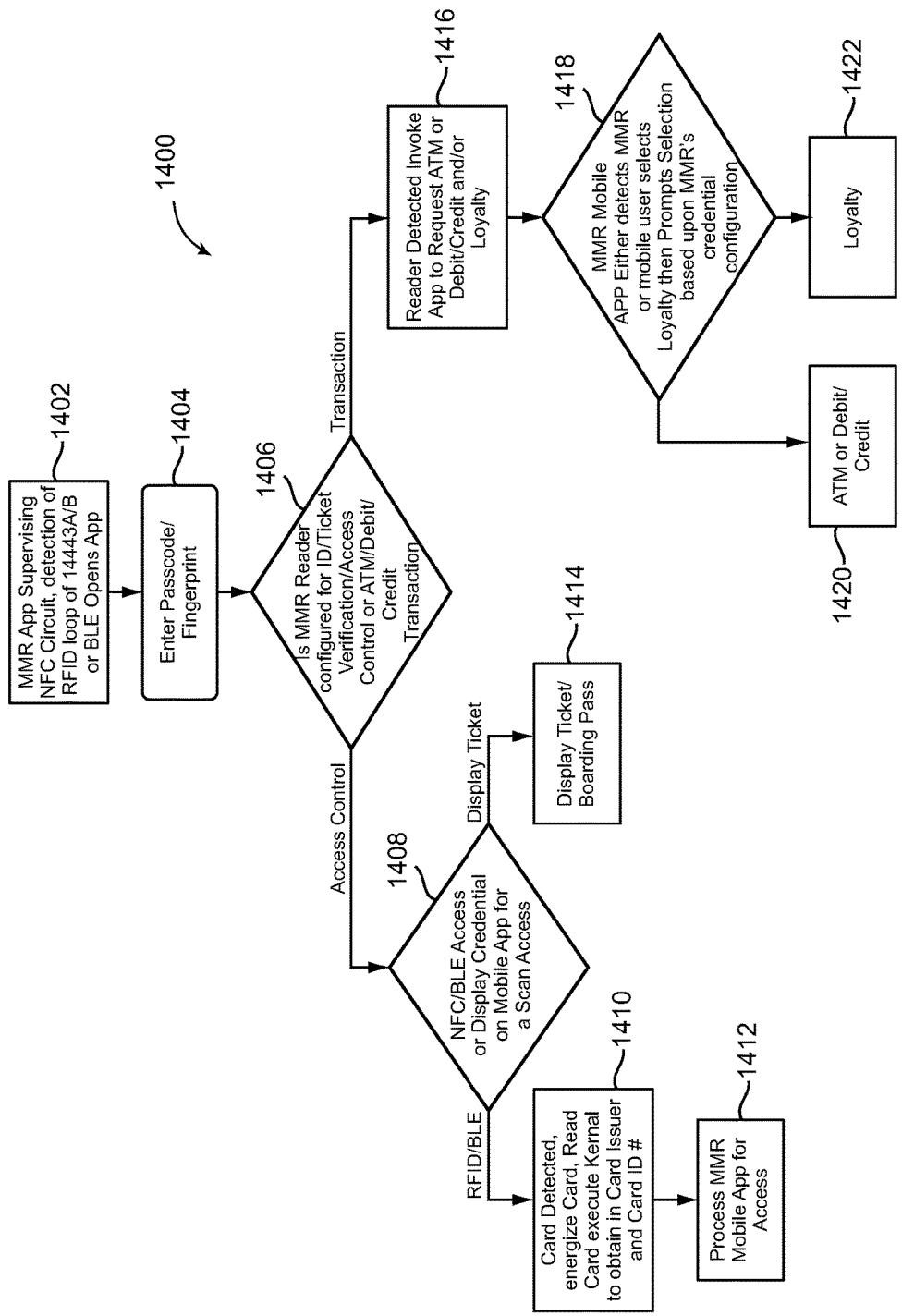
FIG. 17 is a flowchart of a method in accordance with an embodiment of the present disclosure.

Referring to FIG. 17, a method for launching MMR application 902 is described in accordance with the present disclosure. Initially, antenna 706 will detect a signal from an NFC/RFID enabled EMV card or mobile/wearable device 918 placed in close proximity to surface 793 of MMR assembly 702 and the MMR application 902 will be automatically launched on the user's mobile/wearable device 918, in step 1402. In step 1404, the MMR application 902 or the mobile/wearable device 918 operating system will prompt the user to enter a passcode and/or fingerprint (or other security key) into the mobile/wearable device 918.

In step 1406, MMR application 902 and controller 836 of MMR 702, either together or separately, will determine based on the MMR 702 being used, if the MMR 702 is being used for access control (i.e., to gain access to a facility, event, etc.) or for a transaction (i.e., to pull out money from an ATM or complete a purchase at a POS terminal). For example, in one embodiment, MMR 702 may only be configured to access control or only for the completion of a transaction and thus the determination is made based on a setting saved by controller 836. Alternatively, MMR application 902 may include an option for the user to select a type of use that is about to occur with MMR 702 (i.e., either a transaction or access control) and this may be communicated by application 902 to MMR 702 to make the determination.

If it is determined in step 1406 that the MMR 702 is going to be used in access control, the method proceeds to step 1408. In step 1408, it is determined whether a device 918 or a smart card will be used to gain access via NFC/BLE communication with MMR 702 or if a ticket or other credential needs to be displayed in MMR application 902 (e.g., a boarding pass or passport at an airport). If it is determined that a device 918 or smart card is used to gain access, in step 1410, the user credential will be obtained from the device 918 or smart card. For example, the card or device 918 may be presented to MMR 702 (by waiving the NFC/BLE enabled device 918 in front of MMR 702 (and thus obtaining the card issuer and card ID # using antenna 706 and chipset 806 and/or Bluetooth module 805) or by inserting the card into slot 704 to read the magnetic strip 752 of the card using reader 766. In step 1412, once the credential needed for access is obtained (i.e., the data stored on the card or device 918 presented), if the credential is valid, MMR application 902 will generate a selectable button on the touch screen of device 918 that can be pressed by the user to gain access to the facility, event, etc.

Alternatively, if it is determined in step 1406 that the MMR 702 is going to be used in a transaction, the method proceeds to step 1416. In step 1416, MMR application 902 will be invoked on the user's mobile/wearable device, in step 1416, and the MMR application 902 will prompt the user to select one of several options, ATM, DEBIT/CREDIT, LOAYALTY, etc. For example, in one embodiment, MMR application 902 will prompt the user to select between (1) ATM or debit/credit (step 1420) or (2) Loyalty (step 1422).

Figure 18:
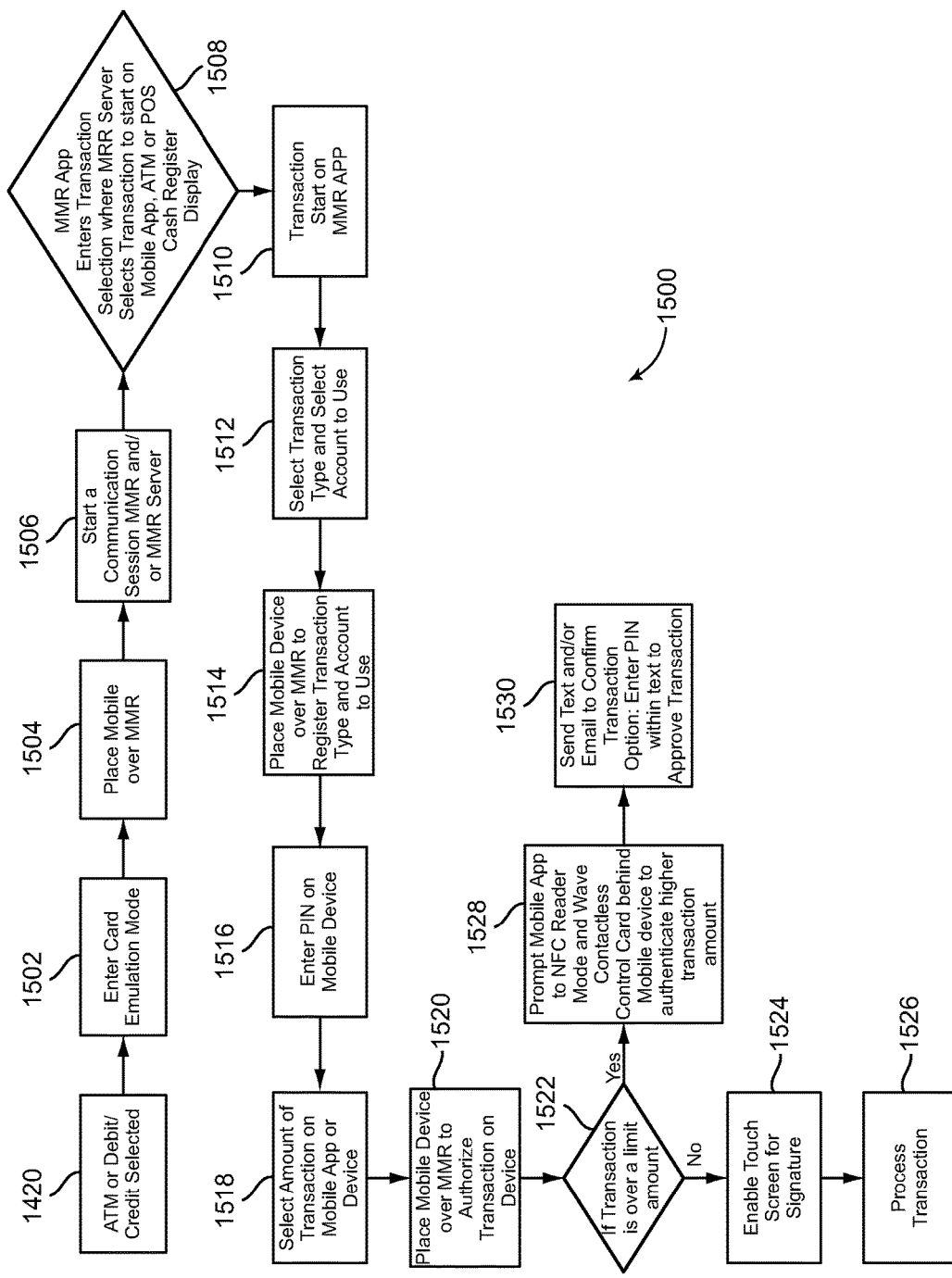
FIG. 18 is a flowchart of a method in accordance with another embodiment of the present disclosure.
Figure 19:
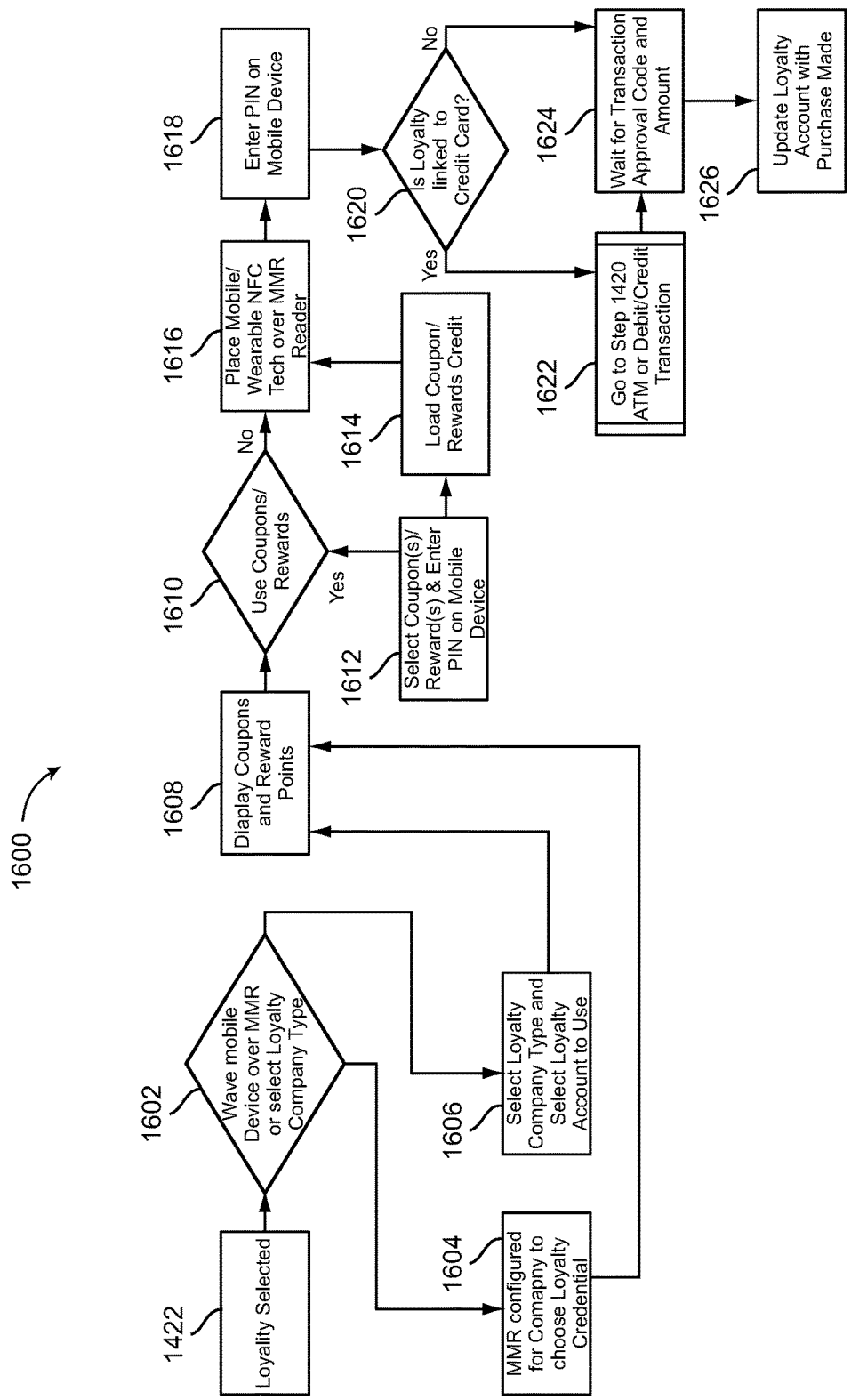
FIG. 19 is a flowchart of a method in accordance with another embodiment of the present disclosure.

If the user selects ATM or debit/credit in the MMR application 902, in step 1420, referring to FIG. 18, MMR application 902 is configured to enter a card emulation mode, in step 1502 and method 1500 is initiated in FIG. 18.

In step 1504, the user will be prompted by MMR application 902 to place the mobile/wearable NFC enabled device over (i.e., in close proximity to) surface 793 of the MMR assembly 702. In step 1506, a communication session is initiated between MMR 702, MMR application 902, 905, and any servers coupled to network 906 that are needed to complete the transaction. The communication session may be initiated via email or text message. In step 1508, the MMR application 902 enters the transaction selection, where MMR server 904 allows the use or another entity coupled to network 906 (e.g., a server in facility 914 or in farm 904) to select the transaction to start on the MMR application 902 or the self-service device (e.g., ATM) or terminal 908 the MMR assembly 702 is coupled to and interfaced with.

In step 1510, the transaction is initiated on MMR application 902 (i.e., MMR application 902 receives streaming information from terminal 908 to allow the transaction to be conducted form the user's device 918). Then, in step 1512, the user will be prompted by MMR 904 to select the transaction type and to select the account to use on the display of the device 918. In step 1514, the user will be prompted by MMR application 902 to place the mobile device 918 over surface 793 of MMR assembly 702 to confirm the transaction type and the account to use. In step 1516, the user will be prompted by MMR application 902 to enter a PIN on the user's mobile device 918. In step 1518, the user will be prompted by MMR application 902 to enter the amount of the transaction in the MMR application 902. Then, in step 1520, the user will be prompted by MMR application 902 to place the mobile device 918 over surface 793 of the MMR 702 to authorize the transaction on the self-service device or terminal 908. In step 1522, it is determined (e.g., based on a communication from card issuer 916) if the transaction is over a limit amount associated with the user's debit/credit account selected. If it is determined, that no limit has been exceeded in step 1522, in step 1524 MMR application 902 will enable the touch screen of mobile device 918 and prompt to the user to enter a signature using the touch screen, and the transaction will be processed, in step 1522.

If it is determined, that a predetermined limit has been exceeded in step 1522, MMR application 902 is configured to enter an NFC reading mode (using the NFC capabilities mobile device 918) and the user is prompted to wave the user's actual card (i.e., as opposed to the credential stored in MMR application 902) over device 918 to be read. This additional security measure may be employed to authenticate higher transaction amounts or transactions in dangerous areas, etc. In step 1530, an email or text will be sent to the user's mobile device 918 (e.g., from issuer 916) including a PIN that the user is prompted to enter into MMR application 902 to approve the transaction as another security measure.

Referring again to FIG. 17, if loyalty is selected, in step 1422, the method proceeds to step 1602 in FIG. 16. In step 1602, the user waved mobile device 1602 over MMR 702 and/or select a loyalty company type within MMR application 902. In step 1602, it is also determined whether the MMR assembly 702 is configured for the loyalty company to choose the loyalty credential or for the user to select the loyalty type. If the MMR assembly 702 is configured for the loyalty company to choose the loyalty credential, in step 1602, the company's choice is determined, in step 1604, and coupons and reward points are displayed on the user's mobile device 918 by app 902, in step 1608. If the MMR assembly 702 is configured for the user to select the loyalty company type and account to use, in step 1602, then the user makes the selection in MMR application 902, in step 1608, and the coupons and reward points are displayed by MMR application 902 on the screen of mobile device 918, in step 1608. In step 1610, it is determined whether to use the coupons and/or the rewards (e.g., based on a user selection in MMR application 902). If it is determined to use the coupons and/or rewards, in step 1610, the user is prompted by MMR application 902 to select the coupons/rewards and enter a PIN on the user's mobile device 918, in step 1612, and the coupon/reward credit is processed, in step 1614. Then, the user is prompted by MMR application 902 to place the mobile/wearable device 918 over surface 793 of MMR assembly 702, in step 1616. Alternatively, if it is determined not to use the coupons/rewards, in step 1610, the user is prompted by MMR application 902 to place the mobile/wearable device over surface 793 of MMR assembly 702, in step 1616.

In step 1618, the user is prompted by MMR application 902 to enter a PIN on the mobile device 918 and then it is determined whether the loyalty is linked to a credit card by MMR application 902, in step 1620. If it is determined that the loyalty is linked to a credit card in step 1620, the method continues to step 1420 (described above) as if the ATM or debit/credit option had been selected, in step 1622, and then the MMR application 902 will wait for the transaction approval code and the amount, in step 1624. If it is determined that the loyalty is not linked to a credit card, in step 1620, the loyalty account will be updated to reflect the purchase made (e.g., by merchant 917 or issuer 916), in step 1626.

Figure 20:
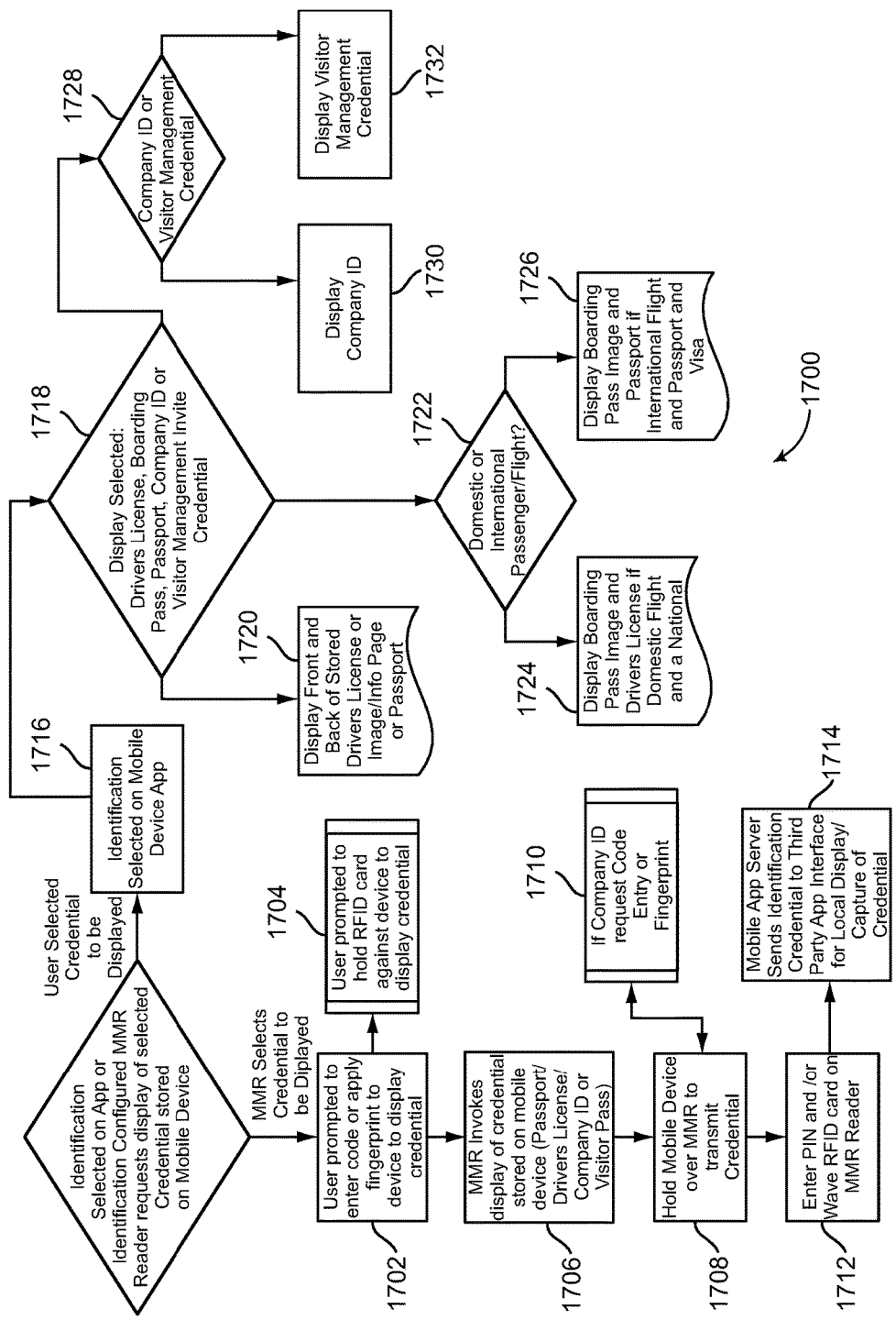
FIG. 20 is a flowchart of a method in accordance with another embodiment of the present disclosure.

Referring again to FIG. 17, if identification is selected, in step 1412, the method proceeds to step 1702 in FIG. 20. In step 1702, the user is prompted by MMR application 902 to enter a security code or apply a fingerprint to the device 918 to display the credential. The user may also be prompted by MMR application 902 to hold an NFC/RFID card against the MMR 702 to display the credential, in step 1704. In step 1706, MMR application 902 will invoke the display of the credential stored on the mobile device 918 (i.e., passport/driver's license/company ID or visitor pass). Then, in step 1708, the user will be prompted by MMR application 902 to hold the mobile device 918 over surface 793 of MMR assembly 702 or a third party RFID/NFC integrated with the MMR application 905 to transmit the credential. If a company ID is selected, in one embodiment, a request for a third party access system code entry or fingerprint may be requested, in step 1710. In step 1712, the user is prompted by MMR application 902 to enter a PIN and/or wave an NFC/RFID card the MMR assembly 702/third party RFID reader. In step 1714, the MMR server 904 sends the identification credential to MMR application 905 of terminal 908 for local display/capture of the credential by terminal 908.

Alternatively, if an identification configured MMR assembly 702 or a third party RFID/NFC reader requests display of selected credential stored on the mobile device, in step 1414, the identification will be selected on the MMR application 902, in step 1716. In step 1718, it will be determined what type of display is selected, where a driver's license, boarding pass, passport, company ID or visitor management invite credential may be selected in MMR application 902.

If, in step 1718, a driver's license is selected, the front and back of the stored driver's license or image/info page or passport will be displayed by MMR application 902 on the screen of mobile device 918, in step 1720. If, in step 1718, a boarding pass is selected, it will be determined if the MMR assembly 702 is being used for a domestic or international passenger/flight, in step 1722. This determination may be made based on transaction information received by MMR application 905. If it is determined that the MMR assembly 702 is being used for a domestic flight and the user is a National of the country, in step 1722, then the boarding pass image and driver's license of the user will be displayed by MMR application 902 on the screen of device 918. If it is determined that the MMR assembly 702 is being used for an international flight and/or the user is not a National of the country, in step 1722, the boarding pass image and passport of the user will be displayed by MMR application 902 on the screen of device 918, in step 1726.

Alternatively, if, in step 1718, a company ID or visitor management credential is selected, it will be determined by MMR application 902 if a company ID or visitor management credential is selected, in step 1728. If it is determined that a company ID is selected, in step 1728, the company ID will be displayed by MMR application 902 on a screen of device 918, in step 1730. If it is determined that the management credential is selected, in step 1728, the visitor management credential will be displayed by MMR application 902 on a screen of device 918, in step 1732. It is to be appreciated that method 1700 allows a user to user MMR application 902 to display credentials on a screen of device 918 to be used in various security contexts (airports, concerts, etc.)

Figure 21:
FIG. 21 is a flowchart of a method in accordance with another embodiment of the present disclosure.

Referring to FIG. 21, a method 1800 is shown in accordance with the present disclosure. In step 1802, MMR application 902 is installed on a mobile device 918 based on one or more triggering events that auto launch the app store of the mobile device 918 and prompt the user of the mobile device 918 to install MMR application 902. For example, as described above and shown in matrix 1100, the triggering events may include BLE and/or NFC communication between MMR 702 and mobile device 918, an SMS or email including a link sent to mobile device 918 from MMR 702 (or MMR facility 914), and/or a barcode, QR code, or NFC tag disposed on (or proximately to) housing 714 of MMR 702 being scanned by mobile device 918. It is to be appreciated that, as stated above, BLE and NFC communication between a mobile device 918 and MMR 702 may also be used to auto launch MMR application 902 on a mobile device 918 that already include MMR application 902.

In step 1804 of method 1800, MMR application 902 is configured to only partially store each of the user's credentials (e.g., passwords, ID numbers, credit/debit cards, etc.) for use in a transaction. When a particular user credential is needed to complete a transaction, communication module 932 or MMR application 902 is configured to request the remaining portions of the credential from one or more servers 904 coupled to network 906. After receiving each of the remaining portions of the requested credential, communication module 932 and/or user credentials module 934 are configured to reassembly or rebuild the requested credential for use in a transaction. After the credential is used in the transaction, the portions of the requested credential that were received by communication module 932 of MMR application 902 are destroyed or erased from user credentials 934 of MMR application 902 and only the original portion of the requested credential is maintained in user credentials 934 of MMR application 902.

In this way, the various embodiments described above provide a means by which a user can share his/her private credentials (e.g., biometric information, financial and/or personal ID numbers, etc.) via any credential storing/sharing apparatus being used by the user (e.g., magnetic stripe cards, EMV cards, mobile/wearable RFID/NFC/BLE/WiFi enabled devices) with a device (MMR 702) being used by any facility requiring the user's private credentials. Furthermore, the various embodiments described above provide a means by which a user's private credentials can be securely shared over one or more networks.

In one embodiment, a 3$^{rd}$ party NFC/RFID/BLE reader may be used with system 900 and methods 1400-1800 described above. In these embodiments, MMR application 905 is stored on a memory of the 3$^{rd}$ party reader or on a memory of a terminal 908 coupled the 3$^{rd}$ party reader to integrate the 3$^{rd}$ party reader into system 900.

Although the disclosure herein has been described with reference to particular illustrative embodiments, it is to be understood that these embodiments are merely illustrative of the principles and applications of the present disclosure. Therefore, numerous modifications may be made to the illustrative embodiments and other arrangements may be devised without departing from the spirit and scope of the present disclosure, which is defined by the appended claims.

Furthermore, although the foregoing text sets forth a detailed description of numerous embodiments, it should be understood that the legal scope of the present disclosure is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed is:

1. A multimedia reader (MMR) assembly, comprising:
    a housing having a first slot disposed through a surface of the housing, the first slot configured to receive a card in a direction of entry into the first slot and into an interior of the housing;
    a near field communication (NFC) antenna disposed in the interior of the housing and adjacent to the surface of the housing, the antenna including a second slot that is aligned with the first slot to receive the card in the direction of entry into the interior of the housing, the antenna configured to communicate via NFC signals with an NFC enabled device placed proximately to the surface of the housing; and
    at least one light sensor and at least one light emitter, the at least one light sensor and at least one light emitter configured to detect an object placed over the first slot.

2. The MMR assembly of claim 1, wherein the NFC antenna includes a generally planar surface that is aligned with and disposed adjacent to the surface of the housing, the second slot disposed through the generally planar surface.

3. The MMR assembly of claim 1, further comprising a bracket coupled to the housing, the bracket configured to mount the MMR assembly to an external surface, the bracket including a tamper switch configured to detect if the MMR assembly has been displaced from the external surface.

4. The MMR assembly of claim 1, further comprising an accelerometer that is configured to detect if the MMR assembly has been moved.

5. The MMR assembly of claim 1, further comprising a Bluetooth module configured to detect and communicate with other devices including Bluetooth capabilities that are located proximately to the MMR assembly.

6. The MMR assembly of claim 5, wherein the Bluetooth module is configured to detect at least one mobile device including Bluetooth capabilities and located proximately to the MMR assembly, and wherein the Bluetooth module is configured to send at least one communication signal to the at least one mobile device to cause a mobile application on the mobile device to be auto launched, the mobile application associated with the MMR assembly.

7. The MMR assembly of claim 1, further comprising a communication module coupled to a network, the MMR assembly configured to receive at least one communication from a mobile device via the NFC antenna, the at least one communication associated with a transaction.

8. The MMR assembly of claim 7, wherein the MMR assembly is coupled to at least one transaction terminal and the communication module is configured to provide the at least one communication to the transaction terminal, the transaction terminal configured to separate the at least one communication into a plurality of communications, each of the plurality of communications being a separate portion of the at least one communication, and send each of the plurality of communications to a separate server via the network.

9. The MMR assembly of claim 7, wherein the MMR assembly is coupled to at least one transaction terminal and the communication module is configured to initiate a communication session between the MMR assembly, the mobile device, and the transaction terminal when the at least one communication is received to complete the transaction.

10. The MMR assembly of claim 9, wherein the communication module is configured to transfer the transaction from the transaction terminal to the mobile device.

11. The MMR assembly of claim 1, wherein at least a portion of the surface of the housing protrudes away from the housing to decrease a thickness of a detection range of the at least on light sensor and at least one light emitter and increase the difficulty of creating an overlay skimming device that can be placed over the surface of the housing.

12. The MMR assembly of claim 1, wherein the NFC antenna is configured to periodically scan for unauthorized contactless communication occurring proximately to the MMR assembly.

13. The MMR assembly of claim 12, wherein the MMR assembly includes a controller configured to transmit an alert signal to a relevant entity if unauthorized contactless communication occurring proximately to the MMR assembly is detected by the NFC antenna.

14. The MMR assembly of claim 1, wherein the NFC antenna is configured to detect at least one mobile device including NFC capabilities and placed proximately to the surface of the housing, and wherein the NFC antenna is configured to send at least one communication signal to the at least one mobile device to cause a mobile application on the mobile device to be auto launched, the mobile application associated with the MMR assembly.

15. The MMR assembly of claim 1, further comprising a magnetic stripe reader assembly disposed in the interior of the housing such that the NFC antenna is disposed between the surface of the housing and the magnetic stripe reader, wherein the magnetic stripe reader assembly is configured to read information on a magnetic stripe of the card when the card is inserted into the interior of the housing through the first slot and the second slot.

16. A system, comprising:
at least one multimedia reader (MMR) assembly configured to receive a user credential, the MMR further configured to provide the user credential to a communication module;
the communication module configured to receive the user credential and separate the user credential into a plurality of communications, each of the plurality of communications including a separate portion of the user credential, the communication module further configured to provide each of the plurality of communications to a separate server of a plurality of servers; and
each of the servers of the plurality of servers configured to receive a corresponding communication of the plurality of communications, wherein a first server of the plurality of servers is configured to request each communication of the plurality of communications from each of the other servers and reassemble the plurality of communications to obtain the user credential.

17. The system of claim 16, wherein the communication module receives transaction data, separates the transaction data into a second plurality of communications, and provides the second plurality of communications to a separate server of the plurality of servers.

18. The system of claim 16, wherein the communication module is included in the MMR assembly.

19. The system of claim 16, wherein the first server is configured to transmit the user credential to at least one of a merchant processor and a card issuer to complete a transaction.

20. The system of claim 16, wherein the first server is a server of the plurality of servers that receives a communication of the plurality of communications earliest relative to each other server of the plurality of servers.

21. The system of claim 16, wherein the MMR assembly further includes a near field communication (NFC) antenna configured to communicate via NFC signals, and the at least one credential is received by the NFC antenna of the MMR assembly.

22. The system of claim 16, further comprising a transaction terminal coupled to the MMR assembly, wherein the user credential is used in association with a transaction involving the transaction terminal.

23. The system of claim 22, wherein the communication module is included in the transaction terminal.

24. The system of claim 22, further comprising a mobile device, wherein the mobile device and the transaction terminal each include an application configured to initiate a communication session between the MMR assembly, the mobile device, and the transaction terminal to complete the transaction.

25. The system of claim 24, wherein the application included in the transaction terminal is configured to stream information associated with the transaction to the application included in the mobile device, the application included in the mobile device configured to display the streamed information associated with the transaction.

26. The system of claim 16, further comprising a mobile device configured to send the user credential to the MMR assembly to complete a transaction, wherein at least one of the mobile device and the MMR assembly are used to obtain location identifying information associated with the transaction, the location identifying information used to authenticate the transaction.

27. The system of claim 16, further comprising a mobile device including an application configured to send the user credential from the mobile device to the MMR assembly, wherein the MMR assembly is configured to detect the presence of the mobile device and cause the application to be auto launched on the mobile device upon detecting the presence of the mobile device.

28. The system of claim 27, wherein each of the mobile device and the MMR assembly are configured with Bluetooth communication capabilities, and the Bluetooth communication capabilities of each are used to detect the presence of the mobile device and auto launch the application on the mobile device.

29. The system of claim 16, further comprising a mobile device configured to provide the user credential to the MMR assembly, the user credential partially stored in a memory of the mobile device and partially stored in at least one remote server, wherein the mobile device is configured to request the part of the user credential stored in the at least one remote server to assemble the user credential and provide the user credential to the MMR assembly.

30. The system of claim 16, wherein the communication module is configured to encrypt each of the plurality of communications.

* * * * *